(12) United States Patent
De Luca et al.

(10) Patent No.: US 12,382,285 B2
(45) Date of Patent: Aug. 5, 2025

(54) TECHNIQUE FOR AUTHENTICATING OPERATORS OF WIRELESS TERMINAL DEVICES

(71) Applicant: Telefonaktiebolaget LM Ericsson (publ), Stockholm (SE)

(72) Inventors: Enrico De Luca, Caserta (IT); Daniele Gaito, Naples (IT); Maria Pia Cancro, Salerno (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 223 days.

(21) Appl. No.: 17/920,540

(22) PCT Filed: Apr. 24, 2020

(86) PCT No.: PCT/EP2020/061496
§ 371 (c)(1),
(2) Date: Oct. 21, 2022

(87) PCT Pub. No.: WO2021/213671
PCT Pub. Date: Oct. 28, 2021

(65) Prior Publication Data
US 2023/0145137 A1    May 11, 2023

(51) Int. Cl.
*G06F 21/00* (2013.01)
*H04W 12/06* (2021.01)
*H04W 12/72* (2021.01)

(52) U.S. Cl.
CPC ........... *H04W 12/06* (2013.01); *H04W 12/72* (2021.01)

(58) Field of Classification Search
CPC ....... H04W 12/06; H04W 12/72; G06F 21/32; G06F 21/88; H04L 63/0861
See application file for complete search history.

(56) References Cited

U.S. PATENT DOCUMENTS

| 9,319,433 | B2 * | 4/2016 | Qiu | ............. | H04L 67/61 |
| 10,033,769 | B2 * | 7/2018 | Khan | ............. | H04L 63/306 |

(Continued)

FOREIGN PATENT DOCUMENTS

WO    2017/101571 A1    6/2017

OTHER PUBLICATIONS

International Search Report and Written Opinion issued in International Application No. PCT/EP2020/061496 dated Jan. 15, 2021 (9 pages).

(Continued)

*Primary Examiner* — Ghazal B Shehni
(74) *Attorney, Agent, or Firm* — Rothwell, Figg, Ernst & Manbeck, P.C.

(57) ABSTRACT

A technique of authenticating an operator of a wireless terminal device is presented, wherein the first terminal device comprises a subscriber identity module (SIM) and wherein a subscription identifier is stored in the SIM. A method aspect of this technique comprises receiving the subscription identifier or a temporary identifier associated with the subscription identifier. The method aspect also comprises receiving a first set of biometric data of the operator, wherein the first set of biometric data has been entered by the operator at the terminal device, and sending a database request towards a subscriber database in a core network domain of a wireless communication system, the database request including the subscription identifier or the temporary identifier. The method further comprises receiving, in response to the database request, a second set of biometric data associated in the subscriber database with the subscription identifier or the temporary identifier, and authenticating the first set of biometric data on the basis of the second set of biometric data so as to obtain a first authentication result.

22 Claims, 18 Drawing Sheets

(56) References Cited

U.S. PATENT DOCUMENTS

| | | | |
|---|---|---|---|
| 2003/0028811 A1* | 2/2003 | Walker | G07C 9/38 |
| | | | 726/5 |
| 2009/0191846 A1* | 7/2009 | Shi | H04L 63/0861 |
| | | | 455/411 |
| 2015/0304317 A1* | 10/2015 | Wang | H04L 63/0853 |
| | | | 455/411 |
| 2018/0032715 A1* | 2/2018 | Jaensch | H04W 4/60 |
| 2019/0222570 A1* | 7/2019 | Krishan | G06F 21/45 |
| 2019/0386826 A1* | 12/2019 | Kato | H04L 63/0861 |
| 2020/0107193 A1 | 4/2020 | Seshadri | |

OTHER PUBLICATIONS

GSMA, "Understanding Capture and Validate KYC Processes: Global Experiences, Challenges and Learnings", May 2019 (46 pages).

* cited by examiner

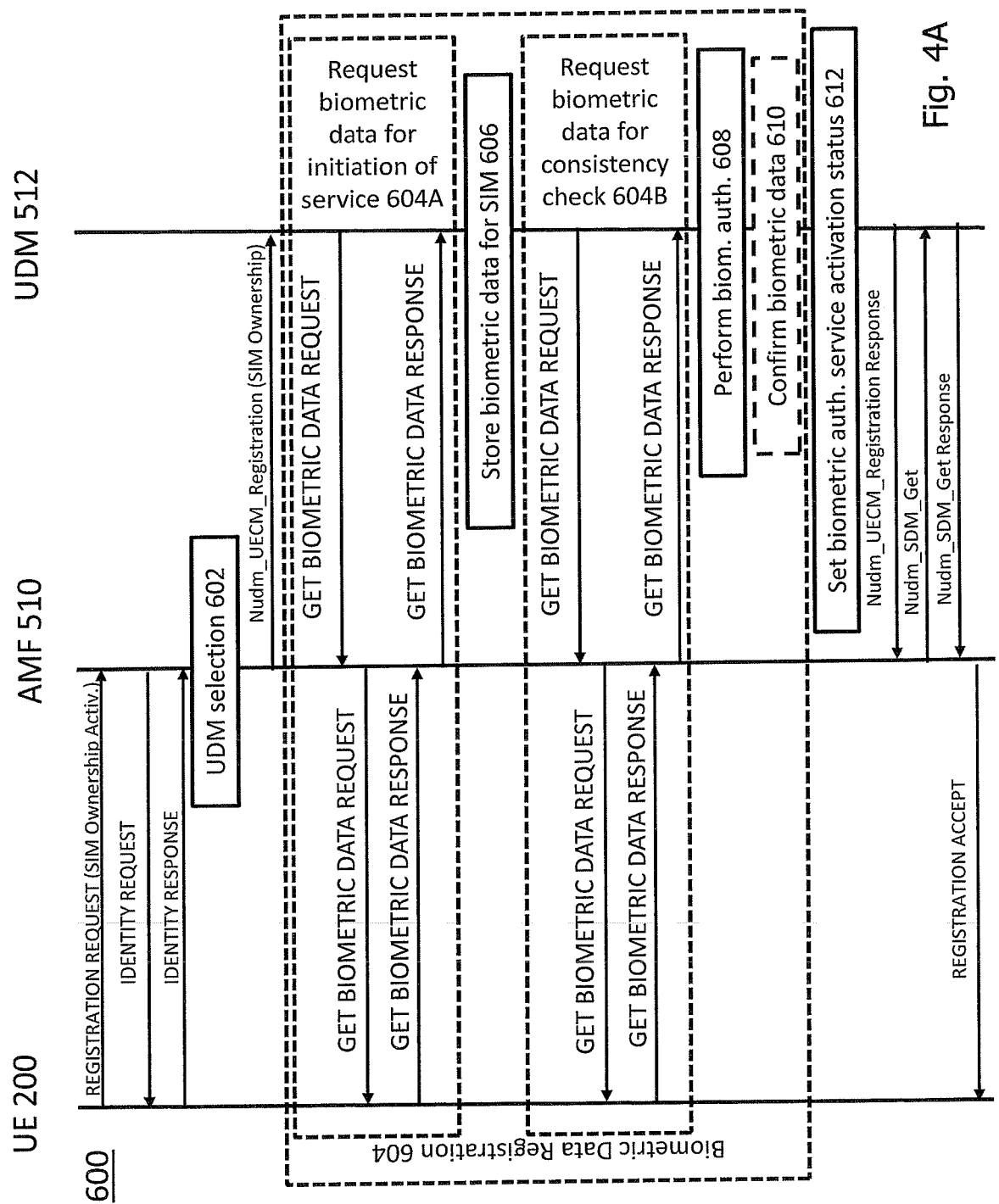

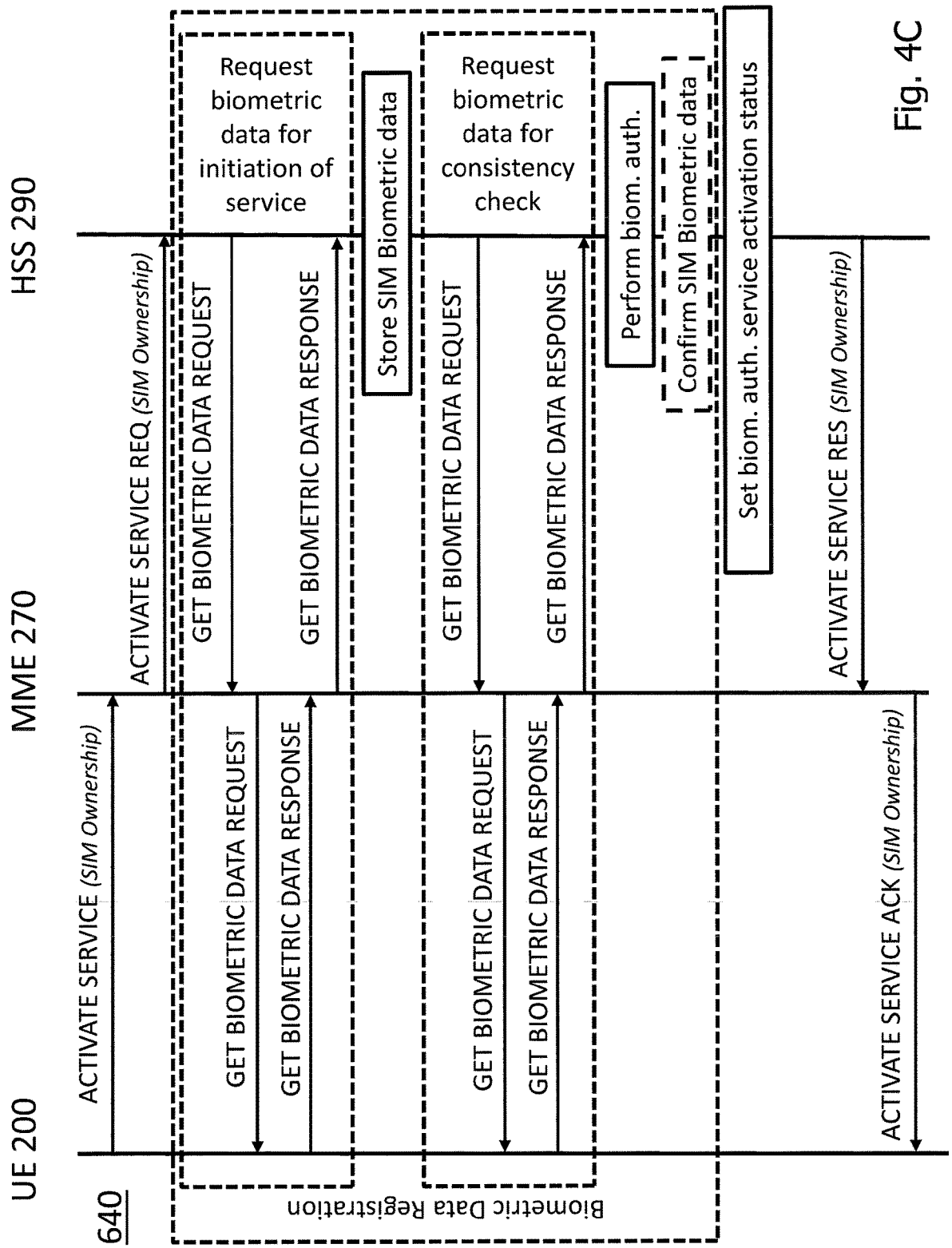

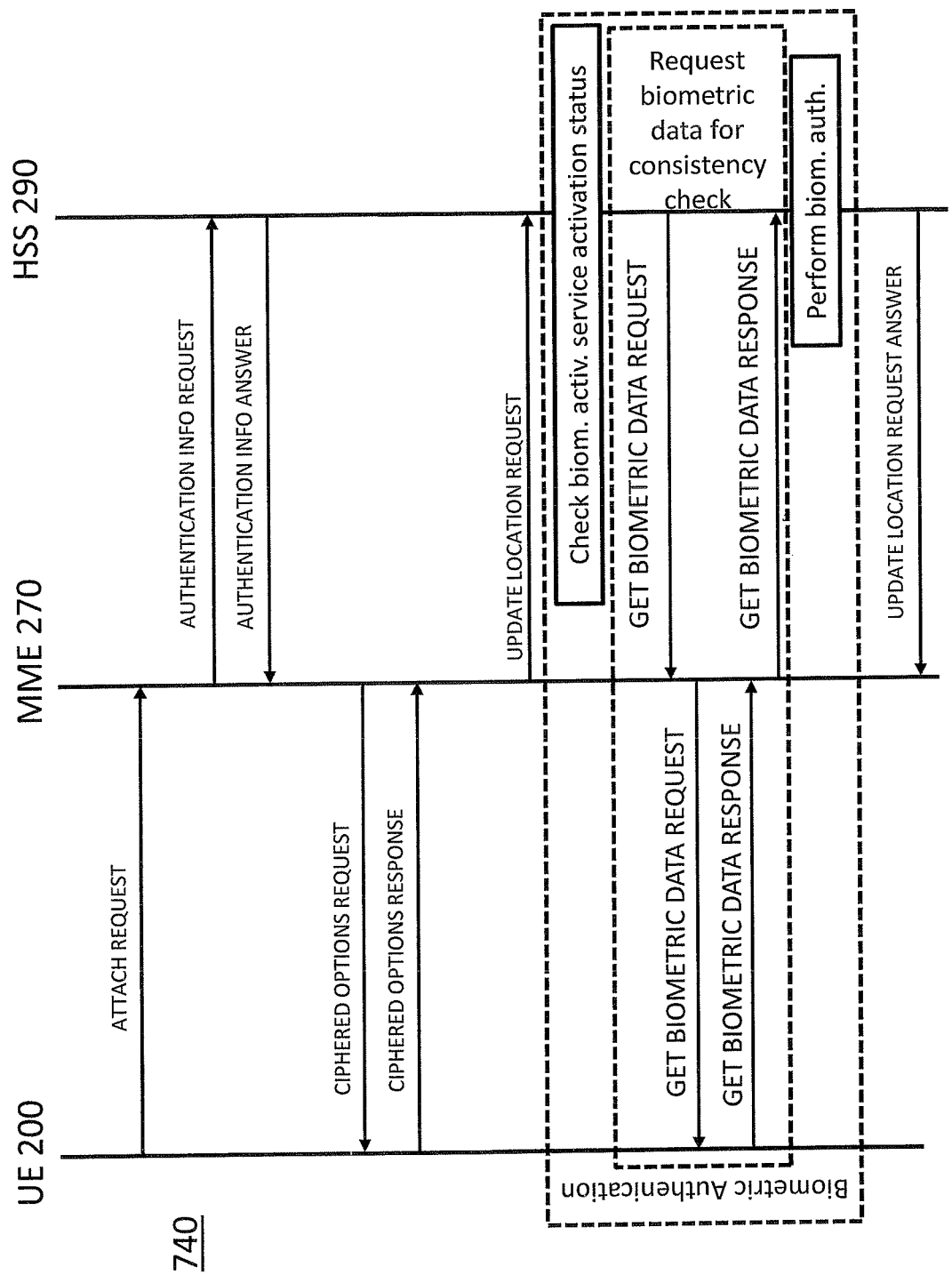

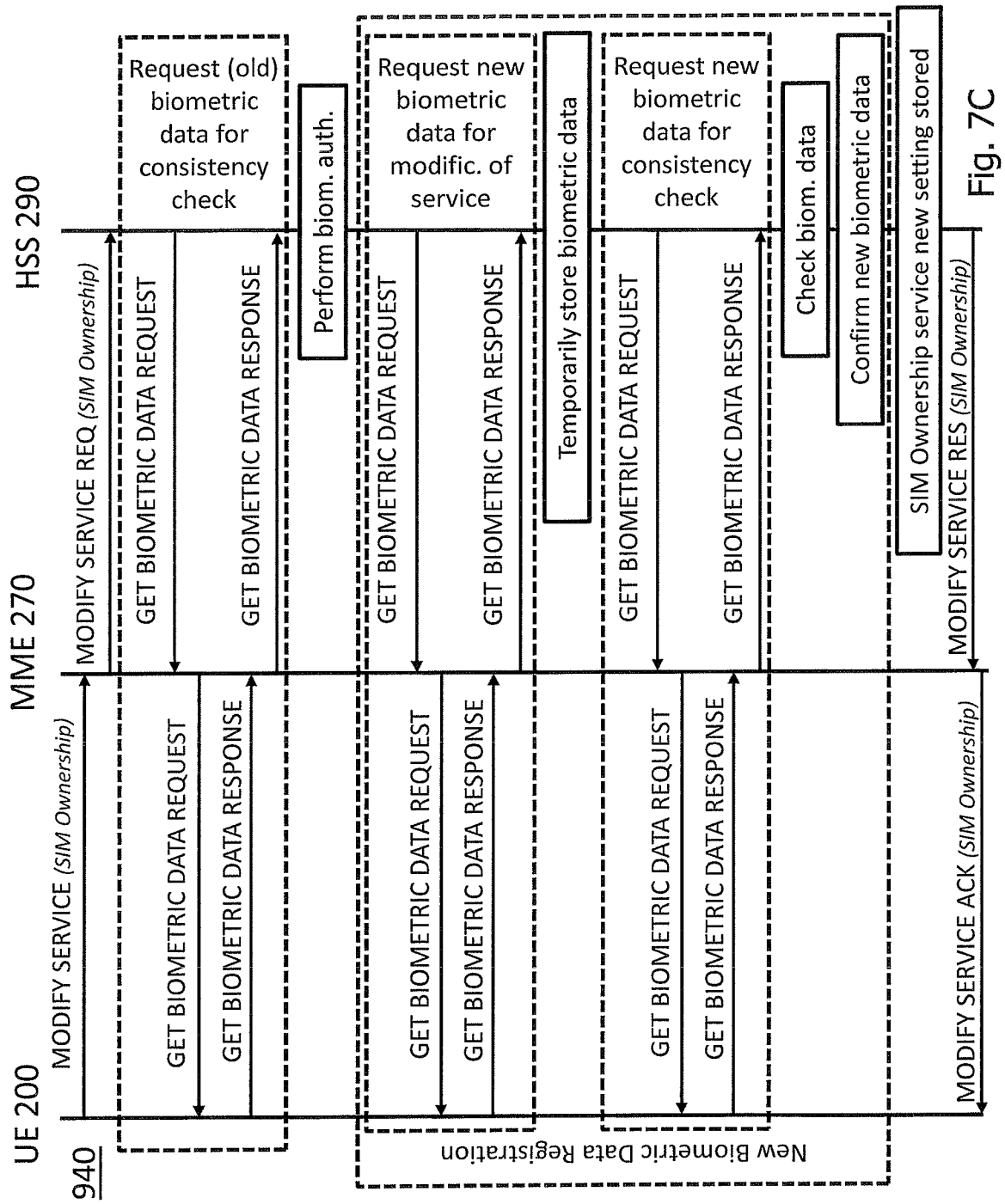

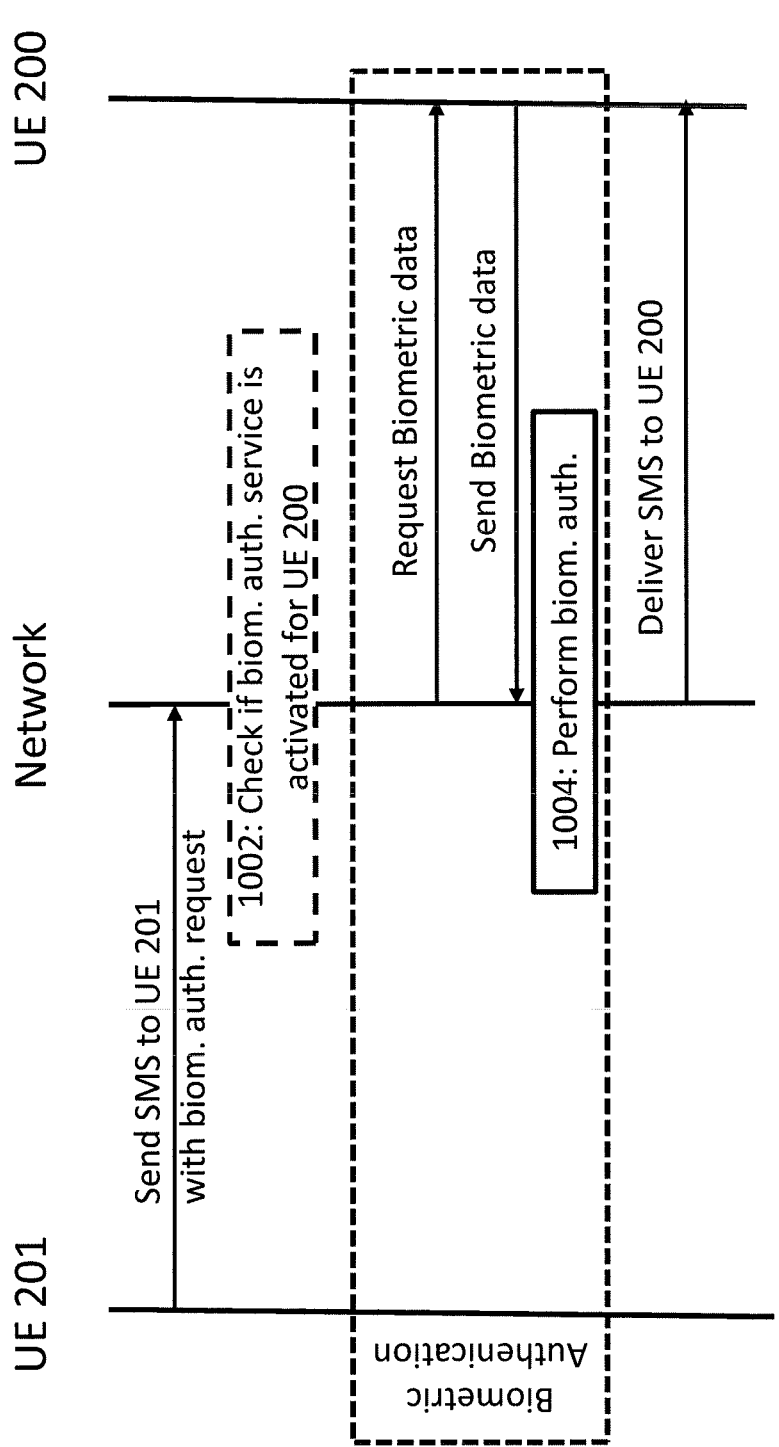

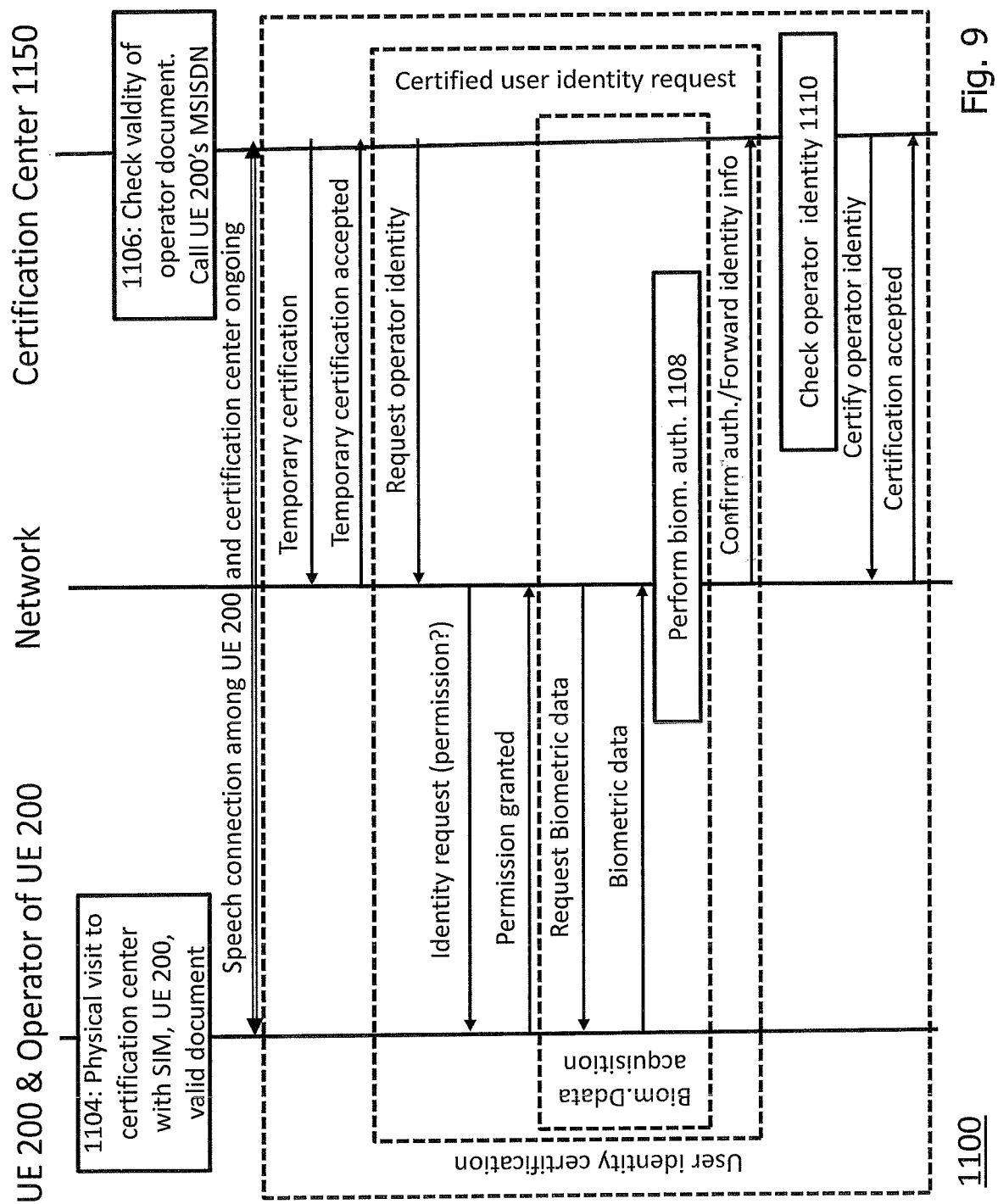

TECHNIQUE FOR AUTHENTICATING OPERATORS OF WIRELESS TERMINAL DEVICES

CROSS REFERENCE TO RELATED APPLICATIONS

This application is a 35 U.S.C. § 371 National Stage of International Patent Application No. PCT/EP2020/061496, filed 2020 Apr. 24.

TECHNICAL FIELD

The present disclosure generally relates to authentication of operators of wireless terminal devices that are equipped with subscriber identity modules (SIMs). The authentication technique presented herein can be implemented in the form of methods, network nodes, network node systems, wireless terminal devices and wireless communication systems.

TECHNICAL BACKGROUND

Many security-critical applications such as online banking solutions and online shopping portals rely on a "two-stage security" mechanism. Some of these mechanisms require users to have their mobile telephone numbers registered. After having logged in with his or her regular password in a first security stage, a message with, for example, a transaction code is wirelessly sent to the mobile telephone (i.e., the user). This transaction code is required as a further input (second security stage) to trigger a particular online banking or online shopping transaction. In other usage scenarios of security-critical applications, a message with a temporary password will be sent the mobile telephone and, thus, to the user if he or she has forgotten the regular password.

In such applications it is tacitly assumed that the current operator of the mobile telephone is identical to the pre-registered user of the corresponding application. In more detail, it is assumed that the mobile telephone associated with the mobile telephone number to which the message is sent actually belongs to and is currently operated by the pre-registered user. Such assumptions are based on the level of trust resulting from the well-governed procedure of obtaining mobile telephone numbers from network providers.

While the procedures to obtain mobile telephone numbers differ from country to country, and while often different procedures are in use within one and the same country, in general a passport or other identity document has to be presented in order to obtain a new mobile telephone number. The network provider registers the identity of the document holder in a (typically proprietary) subscriber database and hands out a subscriber identity module (SIM) with an associated mobile station integrated services digital network (MSISDN) number to him or her. After inserting that SIM into a mobile telephone, the user—as operator of the mobile telephone—can be reached under the MSISDN number, which thus constitutes the user's telephone number.

The SIM is issued together with a pre-set but changeable personal identification number (PIN) that needs to be entered by the operator of the mobile telephone each time the mobile telephone is switched on or reconnects to the wireless network. In this way the operator of the mobile telephone can be authenticated to be—at least in theory—identical with (or authorized by) the person that originally obtained the SIM from the network provider. As explained above, this level of trust can then also be exploited by security-critical applications running on the mobile telephone itself or on a computer within the reach of the operator of the mobile telephone.

While forbidden by national laws, it is still possible to fraudulently obtain a new SIM with the MSISDN number that is actually associated with another person. For example, a fraudster may visit a network provider outlet during heavily frequented business hours and report a third person's mobile telephone stolen. In this way, the fraudster may somehow manage to circumvent the regular security checks. At the network provider outlet, the old SIM in the "stolen" mobile telephone will be deactivated and a new SIM with the MSISDN number associated with the old SIM will be handed out to the fraudster. The fraudster can then insert the new SIM in another mobile telephone to receive messages from security-critical applications actually intended for the legitimate mobile telephone operator.

In such and many other cases, it would be desirable to prevent the fraudulent mobile telephone operator from being able to operate the mobile telephone. At the very least, it would be required to prevent the fraudulent operator from benefiting from the faked identity (e.g., from receiving messages with potentially security-critical content).

SUMMARY

Accordingly, there is a need for increasing the operational security of wireless terminal devices.

According to a first aspect, a method of authenticating an operator of a wireless first terminal device is presented, wherein the first terminal device comprises a subscriber identity module (SIM) and wherein a subscription identifier is stored in the SIM. The method comprises receiving the subscription identifier or a temporary identifier associated with the subscription identifier. The method also comprises receiving a first set of biometric data of the operator, wherein the first set of biometric data has been entered by the operator at the first terminal device, and sending a first database request towards a subscriber database in a core network domain of a wireless communication system, the first database request including the subscription identifier or the temporary identifier. The method further comprises receiving, in response to the first database request, a second set of biometric data associated in the subscriber database with the subscription identifier or the temporary identifier and authenticating the first set of biometric data on the basis of the second set of biometric data so as to obtain a first authentication result.

The first authentication result may be indicative of whether or not the biometric authentication of the terminal device operator was successful. The biometric authentication may be considered successful if the first set of biometric data is substantially identical—at least within a predefined or adjustable margin—with the second set of biometric data. The biometric data may take various forms, such as fingerprints, retina features, facial features, voice samples, and combinations thereof.

The method may further comprise triggering an authentication request prompting the terminal device operator to enter the first set of biometric data. The authentication request may be output to the operator on a graphical or acoustic user interface of the first terminal device. The first set of biometric data is in some variants received responsive to the authentication request.

Triggering the authentication request may comprise triggering one or both of generation and output of the authentication request. Triggering the authentication request may comprise sending a message that commands one or both of generation and output of the authentication request.

The authentication request may be triggered in various different scenarios, and such scenarios may be combined as needed (e.g., in a serial arrangement).

In a first scenario, the authentication request is triggered responsive to or after a positive evaluation that biometric authentication has been activated for a subscription associated with the subscription identifier or the temporary identifier. For example, biometric authentication may selectively be activated or deactivated (e.g., using a binary parameter such as a flag) in a subscription record associated with the subscription identifier or the temporary identifier in the subscriber database.

In a second scenario that may be combined with the first scenario, the authentication request is triggered in the context of or in response to activation, modification or deactivation of biometric authentication for a subscription associated with the subscription identifier or the temporary identifier. As an example, any such action may require a biometric authentication before becoming effective.

In any of the first and second or other scenarios, the method may further comprise storing information pertaining to at least one of activation, deactivation and invocation settings of biometric authentication in the subscriber database or in association therewith. To this end, the subscriber database may contain a dedicated subscription record for the subscription identifier or the temporary identifier where the information can be stored.

In particular in the first scenario, but also in other scenarios, the authentication request may be triggered in the context of a SIM authentication procedure. In the context of the SIM authentication procedure, at least one further authentication may be performed that is based on a secret character string associated with the subscription identifier or the temporary identifier. The secret character string may take the form of a PIN.

The at least one further authentication may comprise receiving a first character string (e.g., a first PIN), wherein the first character string has been entered by the operator at the first terminal device, sending a second database request towards the subscriber database, the second database request including the subscription identifier or the temporary identifier, and receiving, in response to the second database request, a second character string (e.g., a second PIN) associated in the subscriber database with the subscription identifier or the temporary identifier, wherein the second character string is the secret character string. The method may in this case further comprise authenticating the first character string on the basis of the second character string so as to obtain a second authentication result.

In some variants, the second authentication result may be obtained before the first authentication result is obtained. In such or other variants, triggering the authentication request may be made dependent on a successful, or positive, second authentication result (meaning, e.g., that the first character string matches the second character string).

In particular in the first scenario, but also in other scenarios, the authentication request may be triggered in response to invocation of a service being requested by or for the first terminal device. The service may be associated with a security-critical application, such as an online banking application, an online shopping application or a secure communication application.

In particular in the first scenario, but also in other scenarios, the first terminal device may be communicating or starting to communicate with a communication endpoint that is located opposite to the first terminal device. In such a case, the authentication request may triggered by that communication endpoint.

The authentication request may be triggered by the communication endpoint in preparation of a data transmission from the communication endpoint to the first terminal device. The data transmission may be based on a messaging service for which the communication endpoint has specifically requested authentication of the operator of the first terminal device. Such a messaging service may be a Short Messaging Service (SMS), a multimedia messaging service (MMS) or any other messaging service (e.g., WhatsApp or Skype-based). The communication endpoint may be one of a second terminal device and a web server.

The second set of biometric data in the subscriber database may have been certified by a certification authority. The authentication authority may be a governmental authority (e.g., a municipal authority, post office or police station) or a commercial authority (e.g., an authority also entitled to issue electronic certificates). The subscriber database contains information about an identity of a subscriber (typically the owner of the SIM). The identity may also have been confirmed by the certification authority.

While SIMs have historically been distributed as dedicated integrated circuit cards for selective use with different mobile telephones (or wireless terminal devices in general), they can now also be obtained in other variants, such as embedded SIMs (eSIMs) or soft SIMS. An eSIM is a physical SIM which is permanently placed in a wireless terminal device such as a mobile telephone or Internet of Things (IoT) device. This means that an eSIM cannot be removed from such a device. A soft SIMS is a non-physical, conceptual capability of a wireless terminal device that can be provisioned remotely to be securely held in memory. As understood herein, the term SIM covers all such implementations. As such, the SIM may be one of an eSIM and a soft SIM, or a dedicated integrated circuit cards for selective use with different wireless terminal devices.

The subscription identifier may be one of an international mobile subscriber identifier (IMSI) and a subscription permanent identifier (SUPI). The temporary identifier may be one of a temporary international mobile subscriber identifier (TMSI) and a globally unique temporary identifier (GUTI). The subscription identifier may be different from a telephone number (e.g., MSISDN number) under which the first terminal device can be reached. The subscription identifier may specifically be associated with (e.g., burnt into) the SIM.

The method may be performed in the core network domain of the wireless communication network. The wireless communication network may be a $2^{nd}$ or $3^{rd}$ generation (2G/3G), 4G or 5G network. The subscriber database may be situated at or be accessible by one of a home location register (HLR), a home subscriber server (HSS), and a universal data management (UDM) entity, or any other core network node.

According to a second aspect, a method of authenticating an operator of a wireless terminal device is provided, wherein the terminal device comprises a SIM and wherein a subscription identifier is stored in the SIM. The method is performed by the terminal device and comprises wirelessly receiving an authentication request and requesting, in response to the authentication request, a set of biometric data of the operator of the terminal device. The method further comprises receiving the set of biometric data from the operator at the terminal device and wirelessly sending the subscription identifier, or a temporary identifier associated with the subscription identifier, and the set of biometric data of the operator for authentication of the operator.

The set of biometric data may be received (e.g., entered) via a user interface of the terminal device. Depending on the nature of the biometric data, the user interface can be a microphone, a camera, a fingerprint sensor, or a combination thereof.

The authentication request may be received in the context of or in response to activating, modifying or deactivating biometric authentication for a subscription associated with the subscription identifier or the temporary identifier. Such an action may be triggered by the operator of the terminal device via a user interface of the terminal device.

The method of the second aspect may further comprise setting at least one invocation condition defining when biometric authentication of the operator is to be invoked. The at least one invocation condition may be selected from a condition set comprising invocation upon SIM authentication, invocation upon activation of a new SIM, invocation upon association of the SIM with a new device, a periodical invocation, invocation upon invocation of a service, invocation upon a third party request.

The authentication request may be received in the context of a SIM authentication procedure. Alternatively or in addition, the authentication request may be received in response to the terminal device requesting invocation of a service.

The terminal device may be communicating or starting to communicate with a communication endpoint that is located opposite to the terminal device. In such a case, the authentication request may have been triggered by the communication endpoint. The authentication request may be triggered by the communication endpoint in preparation of a data transmission from the communication endpoint to the terminal device.

The method of the second aspect may further comprise receiving an identity request for a verification of an identity of a subscriber associated with the SIM. In such a scenario, the subscriber database may contain information about the identity that has previously been certified, or confirmed, by a certification authority. The identity request may be received together with or in the authentication request. The identity request may be triggered by the network or by a communication endpoint opposite to the wireless terminal device. The method may also comprise sending, by the wireless terminal device, an identity response indicative of whether the validation is permitted to be performed. In some variants, sending the set of biometric data substitutes sending the identity response or constitutes the permission.

Also provided is a computer program product comprising program code portions to perform the method aspects described herein when the computer program product is executed on at least one processor. The computer program product of may be contained on a carrier. The carrier may a physical data carrier (e.g., a hardware memory) or a data signal.

According to a third aspect, a network node or network node system for authenticating an operator of a wireless first terminal device is provided, wherein the first terminal device comprises a SIM and wherein a subscription identifier is stored in the SIM. The network node or network node system is configured to receive the subscription identifier or a temporary identifier associated with the subscription identifier and to receive a first set of biometric data of the operator, wherein the first set of biometric data has been entered by the operator at the first terminal device. The network node or network node system is further configured to send a first database request towards a subscriber database in a core network domain of a wireless communication system, the first database request including the subscription identifier or the temporary identifier, and to receive, in response to the first database request, a second set of biometric data associated in the subscriber database with the subscription identifier or the temporary identifier. The network node or network node system is also configured to authenticate the first set of biometric data on the basis of the second set of biometric data so as to obtain a first authentication result.

The network node or network node system may be configured to perform the method according to the first aspect.

According to a fourth aspect, a wireless terminal device configured to assist in authenticating an operator thereof is provided, wherein the terminal device comprises a SIM and wherein a subscription identifier is stored in the SIM. The terminal device is configured to wirelessly receive an authentication request, to request, in response to the authentication request, a set of biometric data of the operator of the terminal device, and to receive the set of biometric data from the operator at the terminal device. The wireless terminal is further configured to wirelessly send the subscription identifier, or a temporary identifier associated with the subscription identifier, and the set of biometric data of the operator for authentication of the operator.

The terminal device may be configured to perform the method according to the second aspect.

Also provided is a wireless communication system comprising the network node or network node system of the third aspect and the terminal device of the fourth aspect.

BRIEF DESCRIPTION OF THE DRAWINGS

Further aspects, details and advantages of the present disclosure will become apparent from the detailed description of exemplary embodiments below and from the drawings, wherein:

FIGS. 4A-C are signaling diagrams illustrating activation of a biometric authentication service;

FIGS. 5A-C are signaling diagrams illustrating usage of a biometric authentication service in the context of a SIM authentication procedure;

FIGS. 7A-C are signaling diagrams illustrating the changing of settings of a biometric authentication service; and FIGS. 8-10 are signaling diagrams illustrating further aspects in the context of biometric authentication service.

DETAILED DESCRIPTION

Figure 1:
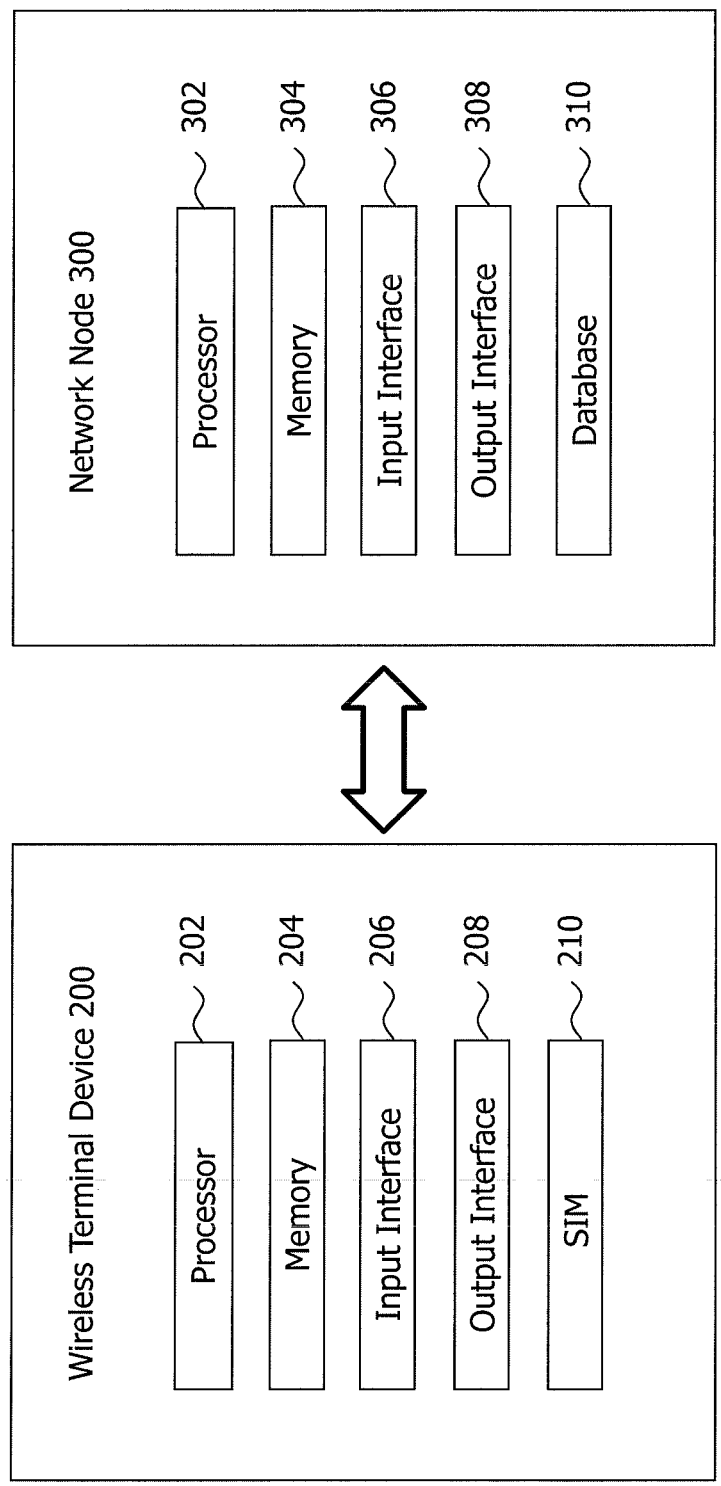
FIG. 1 is a block diagram illustrating a system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description focus on an exemplary core network configuration in accordance with 5G specifications, the present disclosure is not limited in this regard. The present disclosure could also be implemented in other cellular or non-cellular wireless communication networks, such as those complying with 2G/3G or 4G specifications.

Those skilled in the art will further appreciate that the steps, services and functions explained herein may be implemented using individual hardware circuits, using soft-ware functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a wireless communication system 100 in which the present disclosure can be implemented. As shown in FIG. 1, the wireless communication system 100 comprises at least one wireless terminal device 200 and at least one network node 300.

It will be appreciated that the communication system 100 may comprise a plurality of wireless terminal devices served by a network node system comprising multiple network nodes. The multiple network nodes may be distributed between an access network domain and a core network domain.

It will in the following exemplarily be assumed that the wireless terminal device 200 of FIG. 1 is configured to wirelessly communicate with one or more network nodes (e.g., base stations) of the access network domain (not shown). It will further be assumed that the network node 300 of FIG. 1 is located in the core network domain and configured to exchange signalling with the wireless terminal device 200 via the access network domain (e.g., via one or more base stations). It is to be noted that the functionalities of the network node 300 may be distributed among one or multiple core network nodes.

The wireless terminal device 200 can be implemented as a mobile or stationary device, such as a mobile telephone, an IoT device (e.g., a smart sensor or connected car), a laptop, personal computer and so on. The network node 300 can be configured in accordance with 2G/3G, 4G or 5G specifications as defined by the 3$^{rd}$ Generation Partnership Project (3GPP). 5G communication systems are sometimes also referred to as New Radio (NR) systems.

Exemplary configurations of the wireless terminal device 200 and the network node 300 are illustrated in FIG. 1. The wireless terminal device 200 comprises a processor 202 as well as a memory 204 coupled to the processor 202. The memory 204 stores program code that controls operation of the processor 202 so as carry out various processes that will be explained in greater detail with reference to the method embodiments of FIG. 2.

The wireless terminal device 200 further comprises an input interface 206 and an output interface 208. The input interface 206 and the output interface 208 are configured for wireless communication via the access network domain with the network node 300.

The input interface 206 and the output interface 208 may further comprise user interfaces for receiving user input and for generating output for the user. The input interface 206 is in particular configured to generate biometric data characteristic of an operator of the wireless terminal device 200. To this end, the input interface 206 may comprise one or more of a microphone (to generate biometric voice data), a camera (to generate biometric image data, for example of the retina or of facial features) and a fingerprint sensor (to generate biometric fingerprint data). The output interface 208 may be configured to generate an output prompting the operator to enter the biometric data. To this end, the output interface 208 comprise one or both of a display (to generate a graphic or text prompt) and a loudspeaker (to generate a sound prompt).

The wireless terminal device 200 also comprises a SIM 210. The SIM 210 may take the form of a dedicated integrated circuit card for selective use with different wireless terminal devices 200, the form of an eSIM or the form of a soft SIM. A subscription identifier, such as an IMSI or SUPI, is permanently stored on the SIM 210 in a tamper-proof manner. As generally known in the art, the subscription identifier is associated with, and can be used to look up, a subscriber record in a subscriber database in the core network domain.

The network node 300 illustrated in FIG. 1 comprises a processor 302 as well as a memory 304 coupled to the processor 302. The memory 304 stores program code that controls operation of the processor 302 so as carry out various processes that will be explained in greater detail with reference to the method embodiments of FIG. 2. It will be appreciated that the corresponding processes can also be virtualized.

The network node 300 further comprises an input interface 306 and an output interface 308. The input interface 306 and the output interface 308 are configured for communication with the access network domain and, via the access network domain, with the wireless terminal device 200. Moreover, these interface 306, 308 also permit a communication with external networks, such as the Internet. Therefore, the wireless terminal device 200 may communicate via the access network domain and the core network node 300 with such external networks.

The network node 300 also comprises (e.g., hosts) or provides access to a subscriber database 310 in the core network domain. This means that the subscriber database 310 is either hosted on the network node 300 itself or on another core network node that is accessible by the network node 300 (e.g., via the interfaces 306, 308). The subscriber database 310 stores subscription records for multiple subscriptions, wherein each subscription is associated with a dedicated subscription identifier. In the present case each subscription record further comprises, or is linked with, a set of biometric data of the associated subscriber. Such biometric data are, for example, indicative of one or more of fingerprints, retina features, facial features and voice samples of the subscriber.

In the following, high-level operation of the wireless terminal device 200 and of the network node 300 will be described with reference to the flow diagram 400 of FIG. 2. The high-level operation targets at a biometric authentication of an operator of the wireless terminal device 200 by the network node 300. The corresponding steps of FIG. 2 may be executed by the respective processor 202, 302 of the wireless terminal device 200 and the network node 300.

Operation of the network node 300 starts with an optional step 402 in which the network node 300 triggers an authentication request that prompts the operator of the wireless terminal device 200 to enter a first set of biometric data at the wireless terminal device 200.

The authentication request may be triggered by the network node 300 in response to a dedicated internal or external event detected by the network node 300. One such event may be detection that the terminal device operator has requested via the wireless terminal device 200, or otherwise, an activation, modification or deactivation of biometric authentication for the particular subscription associated with SIM 210. Another such event may be a positive evaluation by the network node 300 that biometric authentication is active (e.g., has previously been activated) for this subscription as a prerequisite for one or more further actions (e.g., unlocking of SIM 210, invocation of a dedicated service). A still further such event may be the unlocking of SIM 210 or service invocation. Moreover, another event may be a communication endpoint located opposite to the wireless terminal device 200 having requested biometric authentication of the operator of the wireless terminal device 200 (e.g., as a prerequisite for secure message transfer).

Operation of the wireless terminal device 200 starts with receiving the authentication request in step 404. In the scenario of FIG. 2, the authentication request is generated and sent, via the access network domain, by the core network node 300. In other scenarios, the authentication request may have been generated by a different entity of the communication system 100 or internally within the wireless terminal device 200.

Then, in step 406, the wireless terminal device 200 requests, in response to receipt the authentication request, a first set of biometric data from the current operator of the terminal device 200. To this end, a corresponding textual, graphical or audible prompt may be output via the output interface 208.

The method further comprises receiving, in step 408, the requested first set of biometric data from the operator at the terminal device 200. The first set of biometric data may have been entered by the operator via the input interface 206 of the terminal device.

In step 410, the terminal device 200 wirelessly sends the subscription identifier as stored on its SIM (or a temporary identifier associated with that subscription identifier) and the first set of biometric data entered by the operator in step 408 to the access network domain. The subscription identifier (or the associated temporal identifier) and the first set of biometric data may be sent in the same or in different messages. In the latter case, the messages may be associated with a session context. Then, from the access network domain, these items of information are forwarded to the core network node 300 so as to enable authentication of the operator of the wireless terminal device 200.

In the following discussion of FIG. 2, it will be assumed that the subscription identifier (e.g., the IMSI) has been sent in step 410, but any temporal identifier serving a similar identification purpose (e.g., a TMSI or GUTI) could have been sent as well. The IMSI is typically sent initially when the wireless terminal device 200 registers with the access and/or core network domains for the first time (e.g., when being switched on). The network side then assigns the temporal identifier that will be sent by the terminal device 200 in the following communication so as to hide the IMSI from there on.

The network node 300 receives in step 412 the subscription identifier (or the temporary identifier associated with the subscription identifier) and the first set of biometric data entered by the current operator of the wireless terminal device 200. As explained above, the subscription identifier (or temporary identifier) could in principle be received separately from the first set of biometric data as long as session or other context remains established for the wireless terminal device 200.

In step 414, a database request is sent by the network node 300 towards the subscriber database 310. As discussed above, the subscriber database 310 is situated in the core network domain, either locally on the network node 300 or in a manner accessible by the network node 300. The database request includes the subscription identifier (or the temporary identifier). The database request optionally comprises an indication that a second set of biometric data as previously stored in the subscriber database 310 in association with the subscription identifier (or the temporary identifier) is requested.

The method further comprises receiving, in step 416 and in response to the database request, the second set of biometric data associated in the subscriber database with the subscription identifier (or the temporary identifier).

Then, in step 418, the network node 300 authenticates the first set of biometric data on the basis of the second set of biometric data so as to obtain an authentication result. The authentication result may be positive in case the two sets of biometric data are similar to a sufficiently high degree (as defined, e.g., by a similarity threshold). In response to a positive authentication, the network node 300 may trigger one or more further steps, such as an invocation of a dedicated service for the terminal device 200, a modification of settings in the subscriber database 310, a forwarding of a secure message to the terminal device 200, and so on.

Figure 3:
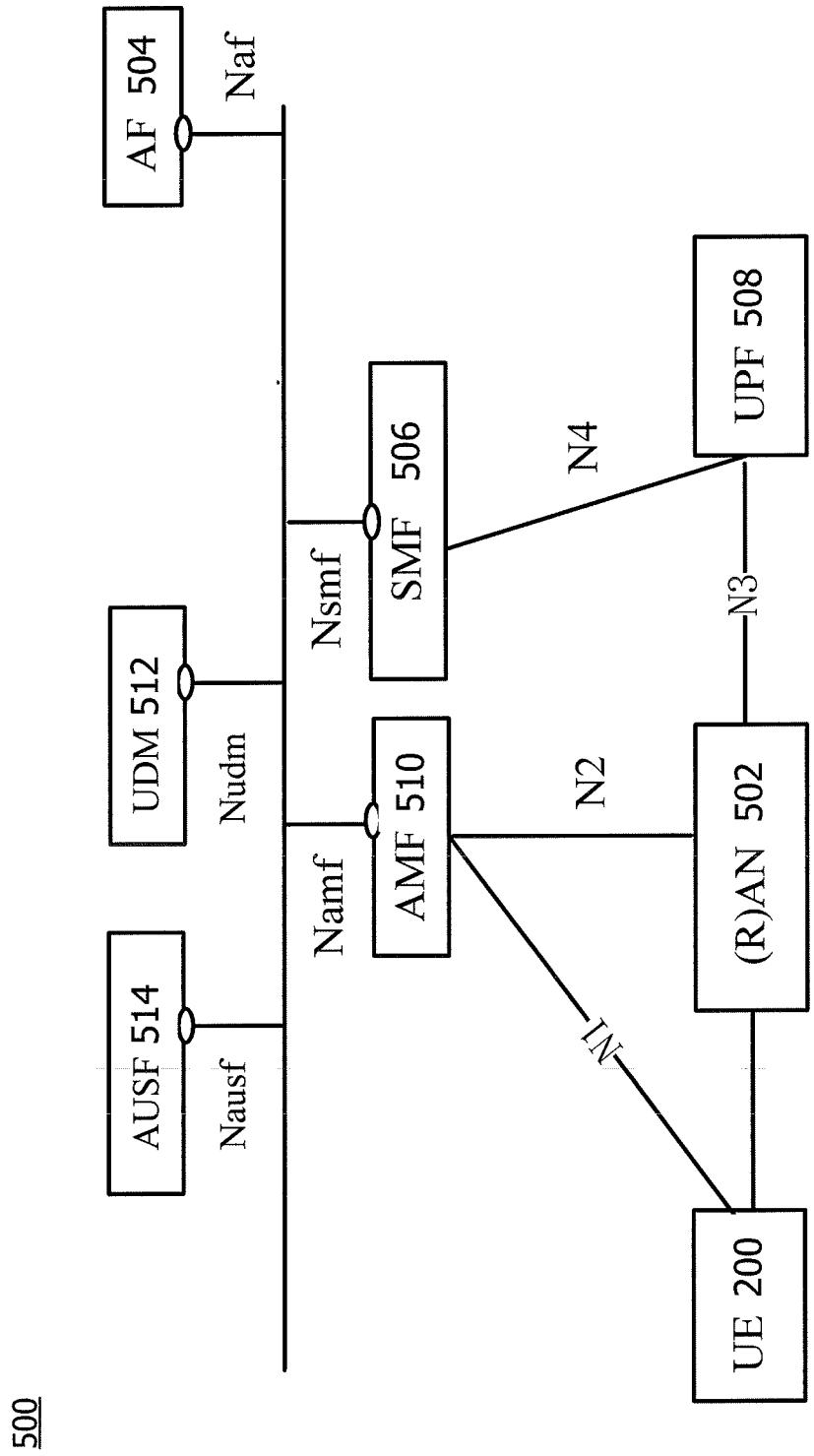
FIG. 3 is a schematic diagram illustrating network entities of a 5G communication system embodiment of the present disclosure.

In the following, more detailed embodiments for biometric authentication procedures and their usages will be described for an exemplary 5G implementation of the wireless communication system 100 of FIG. 1. FIG. 3 depicts a portion of the 5G reference architecture of the communication system 100 as defined by 3GPP (see, e.g., Section 4.2.3 of 3GPP TS 23.501 V16.4.0). Particular network entities and core network interfaces of interest for the following embodiments are now discussed in more detail using 5G standard terminology.

A user equipment (UE) 200 constitutes an exemplary wireless terminal device (see FIG. 1). UE 200 can, for example, be configured as an endpoint of, for example, a video or audio streaming session, a communication session with another UE, or a web session associated with a security-critical application. The corresponding session stretches through a radio access network (RAN) domain 502. An application function (AF) 504, that can be located outside a core network domain, is configured to interact with the core network domain via an Naf interface. AF 504 may be configured as an application server and may in some variants constitute an opposite communication endpoint in the session with UE 200.

A session management function (SMF) 506 is a control plane function with an Nsmf interface. SMF 506 receives policy and charging control (PCC) rules and configures a user plane function (UPF) 508 accordingly. UPF 508 has an N4 interface to SMF 506 and an N3 interface to RAN 502. UPF 508 supports, for example, classification and re-classification of application traffic based on rules received from SMF 506.

An access and mobility management function (AMF) 510 handles access via RAN 502 and mobility for UE 200. Among other things, AMF 510 is responsible for selection of a function in charge of unified data management (UDM) 512 for a given UE 200. UDM 512 is, among many other things, in charge of subscription management. It uses a unified data repository (UDR) to store and retrieve subscription data. In 5G communication networks standardized by 3GPP, UDR thus hosts the subscriber database 310. In some variants of the present disclosure, the network node 300 discussed above with reference to FIGS. 1 and 2 is realized by or comprises UDM 512, optionally in combination with UDR (as subscriber database 310) or an interface to access UDR.

Also shown in FIG. 3 is an authentication server function (AUSF) 514. AUSF 514 supports "regular" authentication for 3GPP network access and untrusted non-3GPP access. In particular, AUSF 514 provides a UE authentication service to requestor network functions (NFs), such as AMF 510 and UDM 512.

In the following, certain 5G-specific biometric authentication procedures will be described with reference to the reference architecture illustrated in FIG. 3. These procedures are at least partially based on the high-level operation discussed above with reference to FIG. 2.

FIG. 4A illustrates a 5G-specific signaling diagram 600 in which a UE 200 activates a biometric authentication service in its associated subscription record as stored in UDR. Activation of the biometric authentication service (also designated as "SIM Ownership Activation" service in FIG. 4A as "physical" SIM ownership will be checked by that service) may mandatorily be performed when the SIM 210 is used or activated for the first time, or at any point in time selected by the operator of UE 200. Once the biometric authentication service has been activated, it can be employed for future procedures (e.g, service invocation, trusted message transfer, etc.) so as to prevent fraudulent acts.

Initially, UE 200 sends a REGISTRATION REQUEST message that is to invoke the SIM Ownership Activation service in the core network domain. This message is routed via RAN 502 to AMF 510, followed by identity request/response signaling between UE 200 and AMF 510. With the REGISTRATION REQUEST message, or earlier, or in each message, UE 200 may include its SUPI (or an associated temporal identifier such as a GUTI), that may also be communicated to UDM 512 (e.g., to establish a session context and/or enable UDM 512 to identify the subscription record associated with UE 200 in the UDR).

AMF 510 then selects an UDM 512 to handle the further procedure with UE 200 and sends a corresponding message via the Nudm interface to the selected UDM 512. This message triggers the actual biometric data registration procedure 604 at UDM 512.

In the variant illustrated in FIG. 4A, the biometric data registration procedure 604 comprises two biometric data acquisition stages 604A, 604B. In the first stage 604A, UDM 512 sends, via AMF 510, a first GET BIOMETRIC DATA REQUEST message to UE 200. This message prompts the operator of UE 200 to enter a first set of biometric data (as explained in greater detail with reference to FIG. 2 above). The corresponding first set of biometric data is returned to UDM 512, via AMF 510, in a first GET BIOMETRIC DATA RESPONSE message. The first set of biometric data thus obtained is then stored by UDM 512 locally or in the subscriber database (see block 606). In the latter case, the first set of biometric data is stored in the particular subscriber record that associated with the SUPI/GUTI of UE 200 in the subscription database of UDR.

It will be appreciated that the first stage 604A can be omitted (i.e., is optional) in some cases, for example if the first set of biometric data has already previously been stored in the subscriber database. For example, the first set of biometric data may have been loaded into the subscriber database from another (e.g., governmental) database or upon purchase of the SIM (e.g., the first set of biometric data may have been entered right at the network provider's SIM outlet). An exemplary scenario in this regard will be discussed below with reference to FIG. 9.

In the second stage 604B, the first set of biometric data obtained in the first stage 604A is confirmed. To this end, UDM 512 sends, via AMF 510, a second (or, when the first stage 604A has been omitted, first) GET BIOMETRIC DATA REQUEST message to UE 200. This message prompts the operator of UE 200 to enter a second set of biometric data (as explained in greater detail with reference to FIG. 2 above). The corresponding second set of biometric data is returned to UDM 512, via AMF 510, in a second (or, in some cases, first) GET BIOMETRIC DATA RESPONSE message. The second set of biometric data thus obtained is then authenticated by the UDM 512 in relation to the first set of biometric data obtained in the first stage 604A (or obtained otherwise) so as to check authentication and legitimate SIM ownership, see block 608. The authentication in block 608 is, for example, performed as explained above with reference to steps 412 to 418 in FIG. 2.

In case the authentication is successful in that authenticity of the second set of biometric data can positively be confirmed in block 608 (i.e., the first and second sets of biometric data are sufficiently similar), the biometric authentication service is set to activate (e.g., by a flag setting or otherwise) in the subscription record associated with UE 200 (see block 612). From that point in time, the biometric authentication service can be used (as will be explained in greater detail below with reference to further signaling diagrams). This fact is signaled to the UE 200 in a REGISTRATION ACCEPT message, as shown in FIG. 4A. Legitimate SIM ownership has thus been verified based on the authentication of the second set of biometric data.

Otherwise, if authentication was unsuccessful, an error message is output. In this case, the operator of UE 200 may be given a limited number of further possibilities to successfully perform the authentication (e.g., stage 604B may be repeated a limited number or times).

In an optional block 610, the first and second sets of biometric data as received in stages 604A and 604B, respectively, can be confirmed to be sufficiently similar (e.g., with respect to a similarity threshold), so that they can be mutually confirmed. This approach is similar to requesting a user to insert a specific password twice so that an erroneous input can be detected. In case block 610 is implemented, block 608 can be omitted (and vice versa), and in block 612 the first set and/or second set of biometric data can then persistently be stored in the subscriber database for later biometric authentication procedures (e.g., as described with reference to block 608).

Figure 4B:
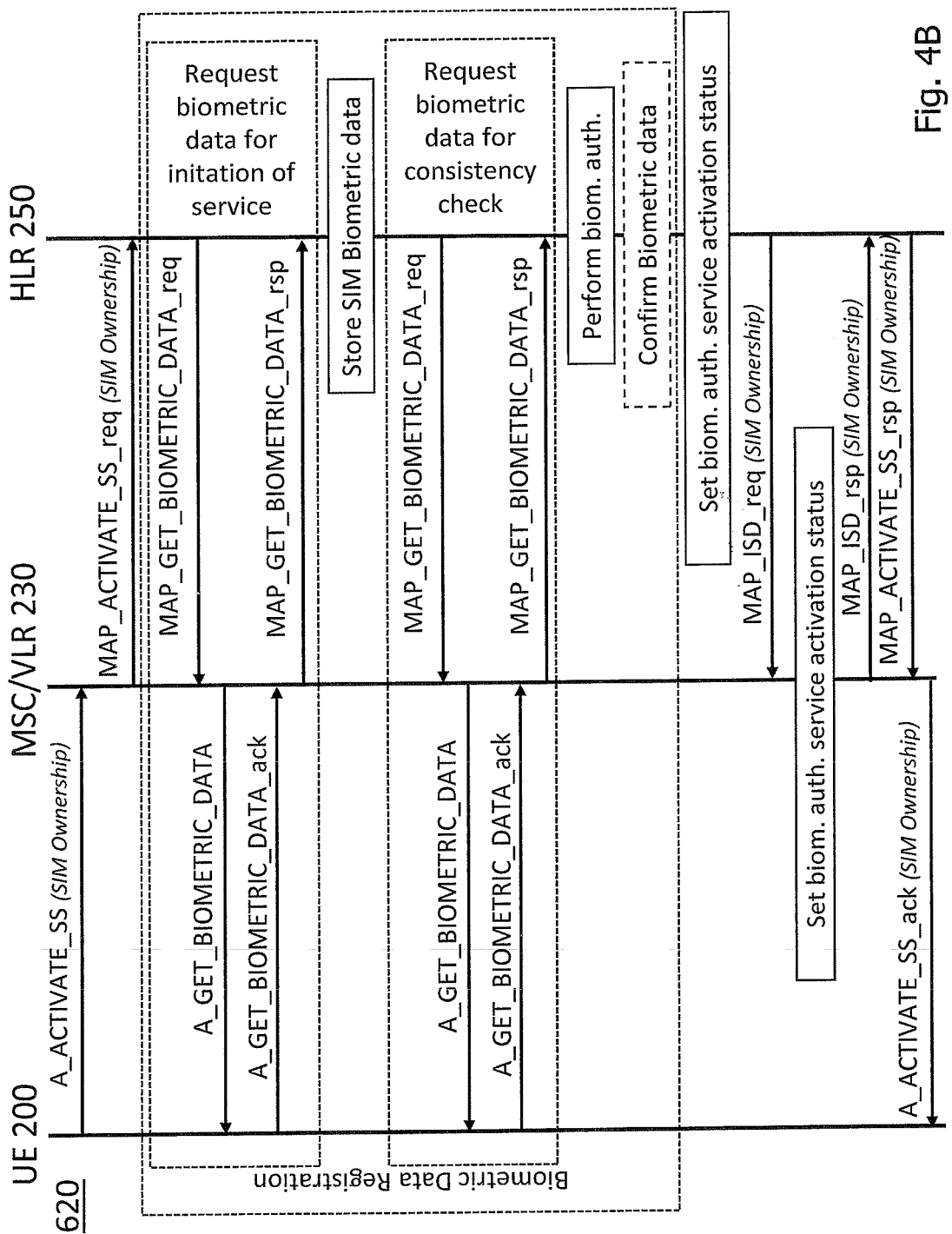

While FIG. 4A illustrates a 5G scenario, it will be appreciated that a similar activation procedure can be performed in 2G/3G and 4G scenarios. In this regard, FIG. 4B shows a 2G/3G-specific signaling diagram 620 in which the roles of AMF 510 and UDM 512 are essentially taken over by a mobile services switching center/visitor location register (MSC/VLR) 230 and a home location register (HLR) 250, respectively. The signaling as such is 2G/3G-specific but substantially similar to the 5G-specific signaling described above with reference to FIG. 4A. A more detailed description thereof is thus omitted here. In a similar manner, FIG. 4C shows a 4G-specific signaling diagram 640 in which the roles of AMF 510 and UDM 512 are essentially taken over by a mobility management entity (MME) 270 and a home subscriber server (HSS) 290, respectively. The signaling as such is 4G-specific but substantially similar to the 5G-specific signaling described above with reference to FIG. 4A.

Figure 5A:
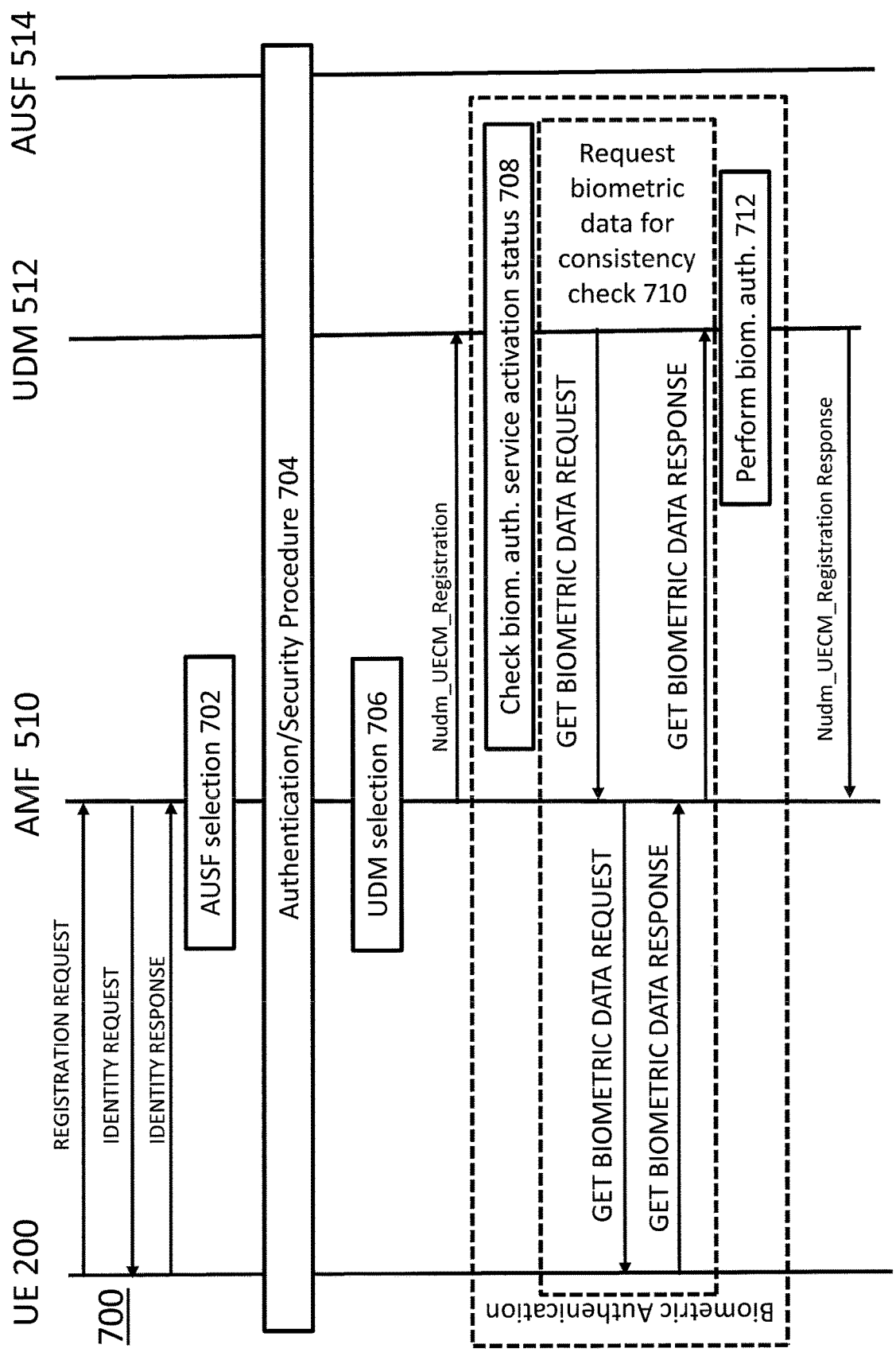

FIG. 5A illustrates a 5G-specific signaling diagram 700 in which, for a dedicated UE 200, the biometric authentication service has been set to active in its associated subscription record (as explained above with reference to FIG. 4A). Since the biometric authentication service has been activated, it can be employed to perform a supplemental authentication procedure in addition to the regular SIM authentication procedure (as performed, e.g., at initial registration of UE 200 in AMF 510/UDM 512). This means that not only SIM 210 is authenticated as such, but also the operator of UE 200 equipped with that SIM 210 (i.e., "physical" SIM ownership is checked). If both authentication procedures are successful, UE 200 can be operated in a regular manner. Otherwise, UE 200 may remain locked (e.g., in the same manner as if conventional SIM authentication has failed).

Still referring to FIG. 5A, the process starts with UE 200 sending a REGISTRATION REQUEST message to AMF 510, followed by IDENTITY REQUEST/RESPONSE signaling. The AMF 510 then selects an AUSF 514 associated with the UE 200 (see block 702). What follows is a regular SIM authentication procedure that can involve further security checks (see block 704). In general, the SIM authentication procedure will comprise receiving by AUSF 514 a first PIN entered by the operator at UE 200, receiving the associated SUPI or GUTI (potentially together with the first PIN), triggering a database request towards the subscriber database on UDR with the SUPI/GUTI, and receiving a second PIN associated in the subscriber database with the SUPI or GUTI. The AUSF 514 may then authenticate the first PIN on the basis of the PIN so as to obtain a second authentication result.

In case SIM authentication is successful in that both PINs are identical, the AMF 510 performs UDM selection in block 706 and sends a Nudm_UECM_Registration message to the selected UDM 512. At receipt of this message, UDM 512 checks based on the received SUPI or GUTI in the subscriber database on UDR if the biometric authentication service has been activated for the associated description (as explained above with reference to FIGS. 4A to 4B), see block 708. In case of that service being set to active, the UDM 512 will request biometric data from the operator of UE 200 in block 710. The signaling steps involved in this regard are illustrated in FIG. 2, wherein the GET BIOMETRIC DATA REQUEST message triggered by UDM 512 corresponds to step 402 and wherein the biometric data are received (see step 412) with the GET BIOMETRIC DATA RESPONSE message. These steps have also been explained above with reference to stage 604B of FIG. 4A. Then, in accordance with step 418 of FIG. 2, the biometric data set received with the GET BIOMETRIC DATA RESPONSE message are authenticated in block 712 and a Nudm_UECM_Registration_Response message indicative of the authentication result is returned to the AMF 510. In case the authentication result is positive, the AMF 510 continues processing of the original REGISTRATION REQUEST message of UE 200 as usual, otherwise that request is denied.

Figure 5B:
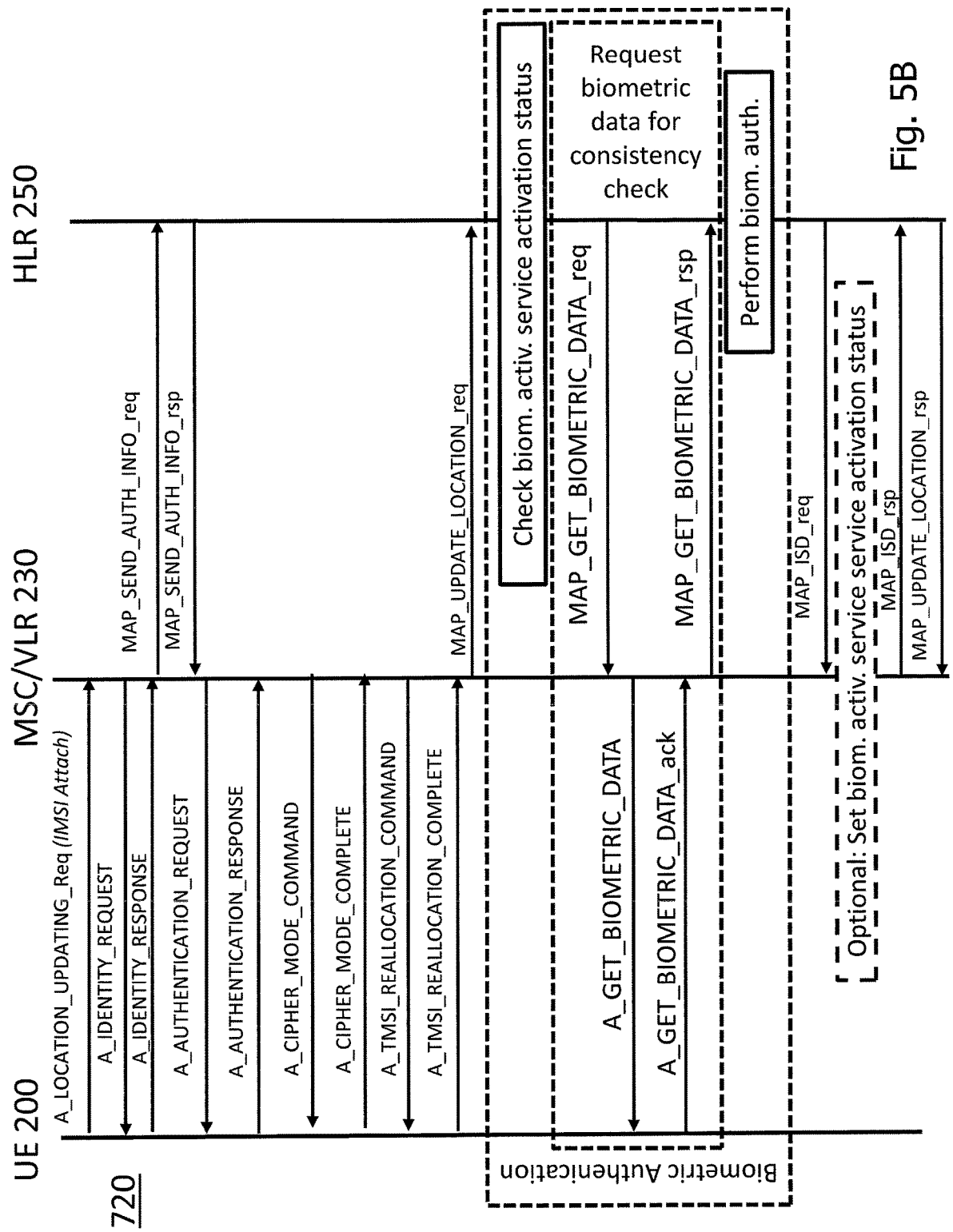

While FIG. 5A illustrates a 5G scenario, it will be appreciated that a similar activation procedure can be performed in 2G/3G and 4G scenarios. In this regard, FIG. 5B shows a 2G/3G-specific signaling diagram 720 in which the roles of AMF 510 and UDM 512/AUSF 514 are essentially taken over by MSC/VLR 230 and HLR 250, respectively. The signaling as such is 2G/3G-specific but substantially similar to the 5G-specific signaling described above with reference to FIG. 5A. A detailed description thereof is thus omitted here, but it is pointed to the usage of IMSI and of TMSI replacing IMSI at a later signaling stage. In a similar manner, FIG. 5C shows a 4G-specific signaling diagram 740 in which the roles of AMF 510 and UDM 512/AUSF 514 are essentially taken over by MME 270 and HSS 290, respectively. The signaling as such is 4G-specific but substantially similar to the 5G-specific signaling described above with reference to FIG. 5A.

Figure 6A:
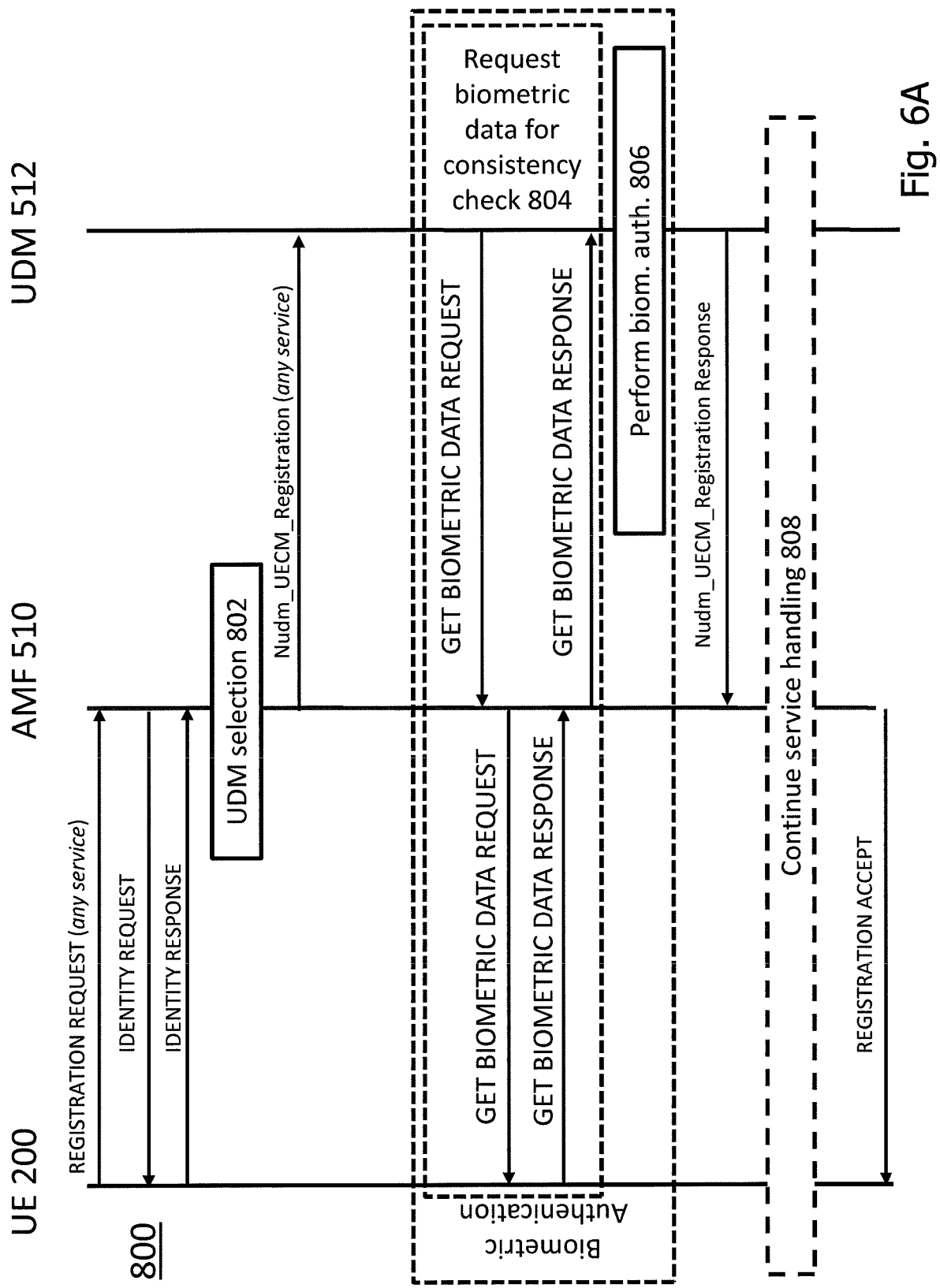
FIGS. 6A-C are signaling diagrams illustrating usage of a biometric authentication service in the context of service invocation.

FIG. 6A illustrates a 5G-specific signaling diagram 800 in which, for a dedicated UE 200, the biometric authentication service has been set to active in the associated subscription record (as explained above with reference to FIG. 4A). Since the biometric authentication service has been activated, it can be employed to perform a biometric authentication procedure in response to invocation of a service. Service invocation may be performed by the UE 200 itself of by another entity for the UE 200. The service as such may be security-critical in that it has to be ensured that the service is provided to the legitimate operator of the UE 200 (i.e., that the SIM 210 in the UE 200 is "physically" owned by the its legitimate owner).

One or more invocation conditions may be defined that is/are indicative of when biometric authentication of the operator is to be invoked. The at least one invocation condition may be selected from a condition set comprising invocation upon SIM authentication, invocation upon activation of a new SIM 210, invocation upon association of the SIM 210 with a new device, a periodical invocation, invocation upon invocation of a service, and invocation upon a third party request.

With reference to FIG. 6A, the biometric authentication process starts with UE 200 sending a REGISTRATION REQUEST message to AMF 510, followed by IDENTITY REQUEST/RESPONSE signaling. The REGISTRATION REQUEST message indicates a particular service that is to be invoked (or a sub-service of a previously invoked service). AMF 510 then performs UDM selection in block 802 and sends a Nudm_UECM_Registration message indicative of the service to be invoked to the selected UDM 512. At receipt of this message, UDM 512 may check based on the SUPI or GUTI (that may be received with the Nudm_UECM_Registration message or any other message) in the subscriber database on UDR if the biometric authentication service has been activated for the associated description (as explained above with reference to FIGS. 5A to 5B). In case of that service being set to active, the UDM 512 will request biometric data from the operator of UE 200 in block 804. The signaling steps involved in this regard are illustrated in FIG. 2, wherein the GET BIOMETRIC DATA REQUEST message triggered by UDM 512 corresponds to step 402 and wherein the biometric data are received (see step 412) with the GET BIOMETRIC DATA RESPONSE message. These steps have also been explained above with reference to stage 604B of FIG. 5A. Then, in accordance with step 418 of FIG. 2, the biometric data set received with the GET BIOMETRIC DATA RESPONSE message is authenticated in block 806 and a Nudm_UECM_Registration_Response message indicative of the authentication result is returned to AMF 510. In case the authentication result is positive, AMF 510 continues service handling in block 808 as usual and sends a REGISTRATION ACCEPT message to the UE 200. In case of a negative authentication result, service handling is denied by AMF 510.

Figure 6B:
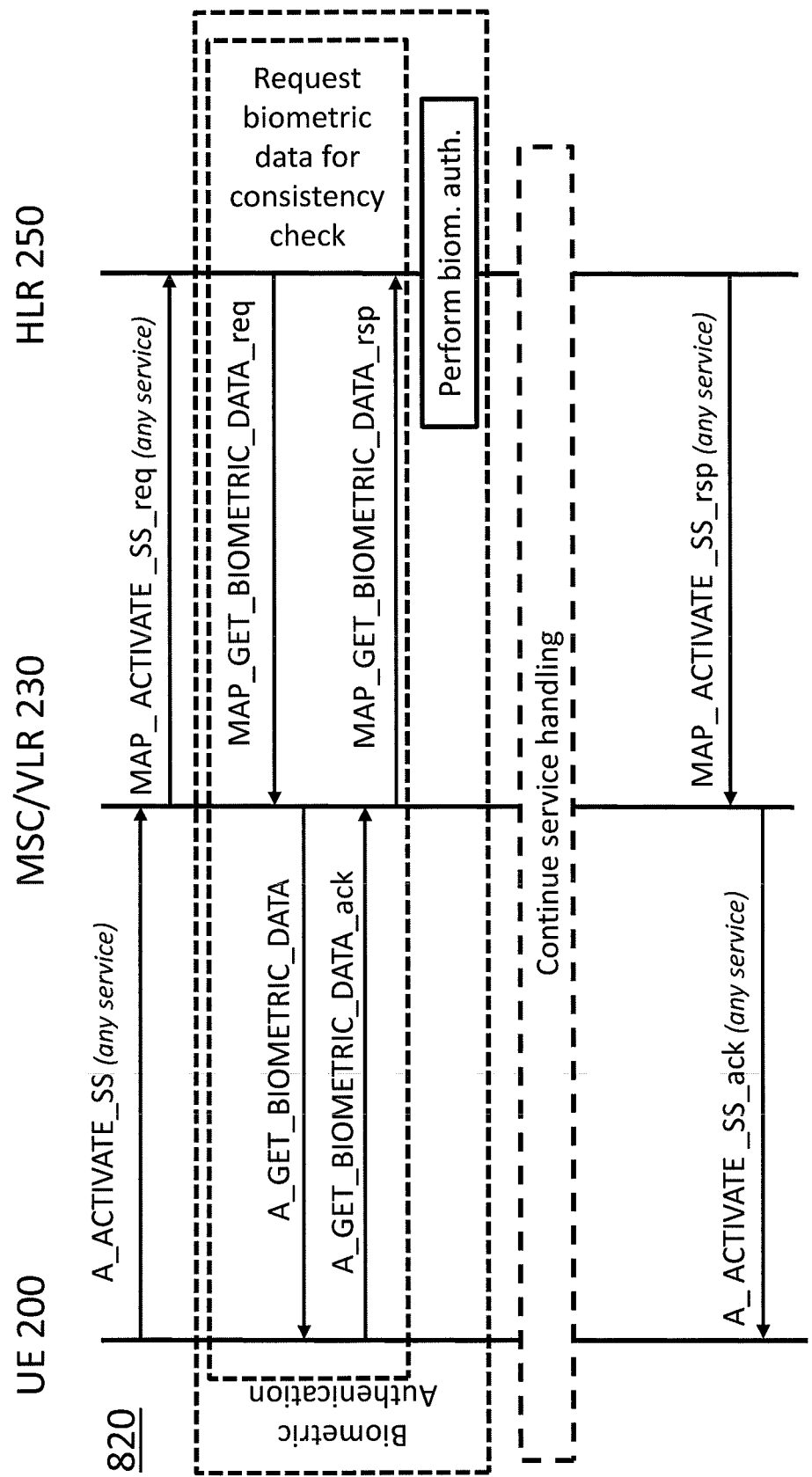
Figure 6C:
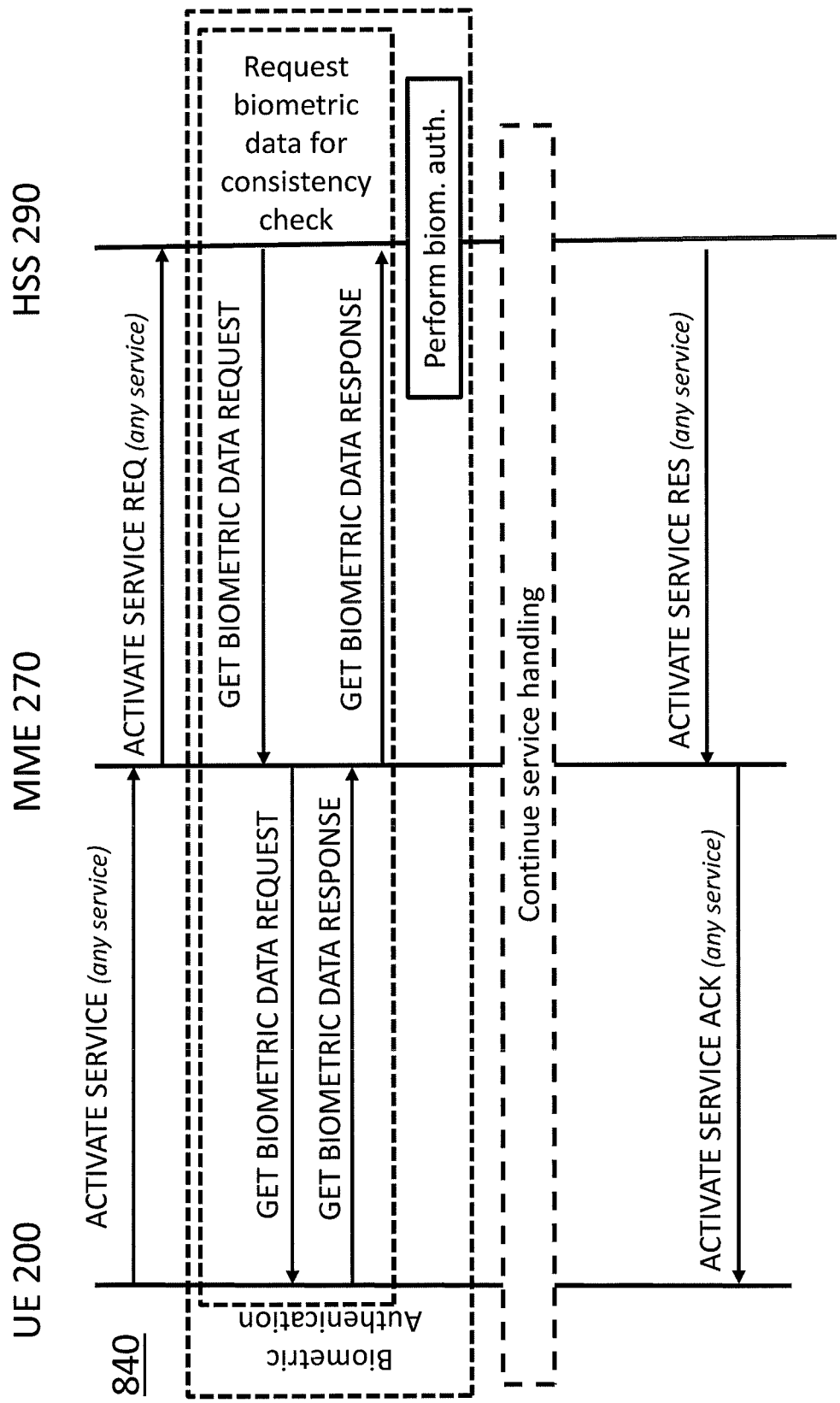

While FIG. 6A illustrates a 5G scenario, it will be appreciated that a similar activation procedure can be performed in 2G/3G and 4G scenarios. In this regard, FIG. 6B shows a 2G/3G-specific signaling diagram 820 in which the roles of AMF 510 and UDM 512 are essentially taken over by MSC/VLR 230 and HLR 250, respectively. The signaling as such is 2G/3G-specific but substantially similar to the 5G-specific signaling described above with reference to FIG. 6A. A detailed description thereof is thus omitted here. In a similar manner, FIG. 6C shows a 4G-specific signaling diagram 840 in which the roles of AMF 510 and UDM 512 are essentially taken over by MME 270 and HSS 290, respectively. The signaling as such is 4G-specific but substantially similar to the 5G-specific signaling described above with reference to FIG. 6A.

Figure 7A:
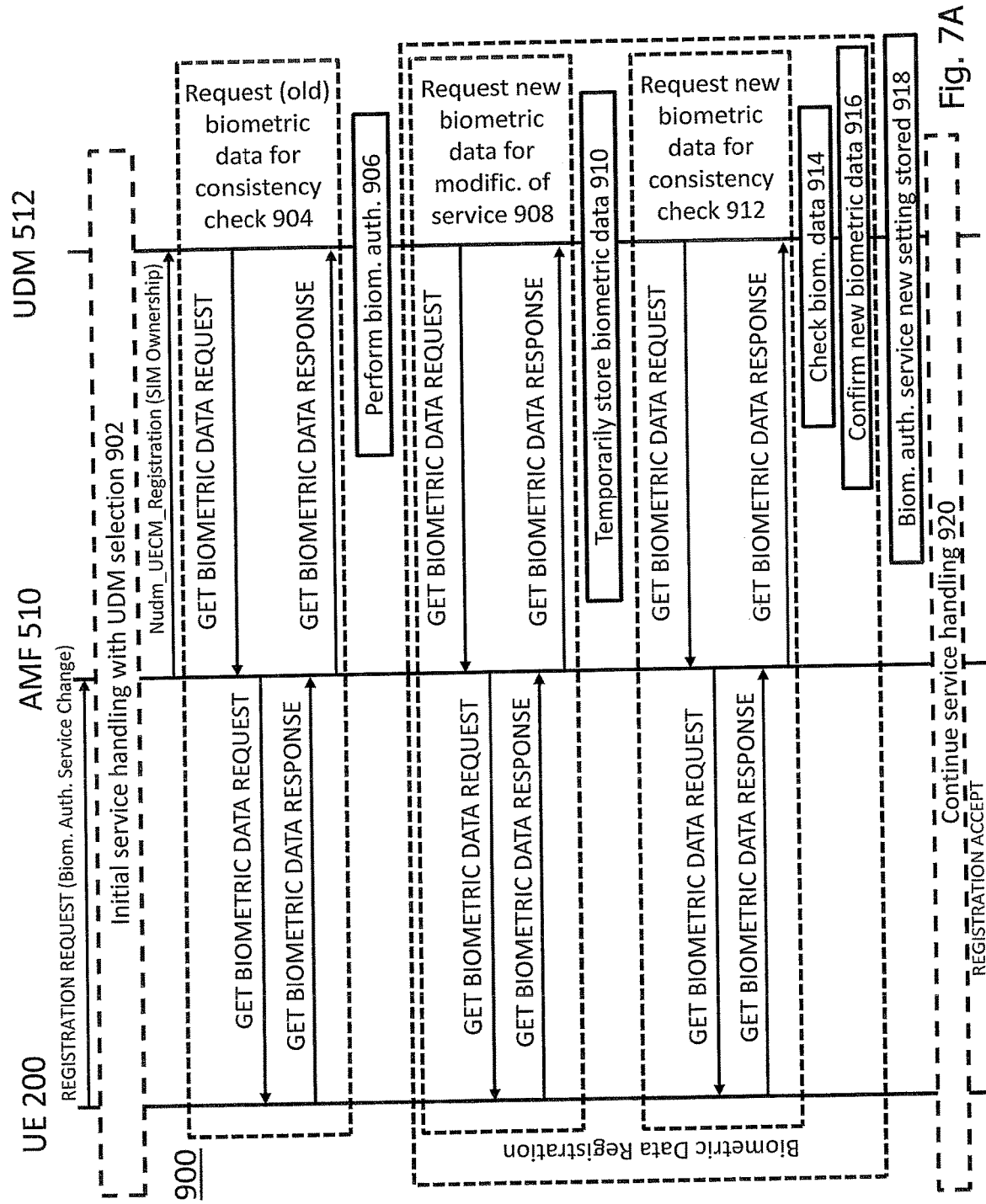

FIG. 7A illustrates a 5G-specific signaling diagram 900 in which, for a dedicated UE 200, the biometric authentication service has been set to active in the associated subscription record (as explained above with reference to FIG. 4A). Since the biometric authentication service has been activated, it may be necessary to deactivate it at some point in time or to modify it.

With reference to FIG. 7A, the process starts with UE 200 sending a REGISTRATION REQUEST message to AMF 510, followed by IDENTITY REQUEST/RESPONSE signaling. The REGISTRATION REQUEST message indicates that a change of the biometric authentication service is desired. The AMF 510 may then perform regular service handling with UDM selection in block 902. Thereafter, it sends a Nudm_UECM_Registration message indicative of the requested change of the biometric authentication service to the selected UDM 512. The UDM 512 will request biometric data from the operator of UE 200 in block 904 to authenticate the operator of UE 200 and, thus, to verify that the operator is actually the legitimate SIM owner and, thus, entitled for perform such a change. The signaling steps involved in this regard, including transmission of the GET BIOMETRIC DATA REQUEST message and the GET BIOMETRIC DATA RESPONSE message, have already been explained above. Then, in accordance with step 418 of FIG. 2, the biometric data set received with the GET BIOMETRIC DATA RESPONSE message is authenticated in block 906. In case the authentication result is positive, UDM 512 proceeds dependent on the type of change is requested.

In case the operator of UE 200 requested to deactivate the biometric authentication service, the UDM 512 changes the setting in the associated subscriber record accordingly and proceeds to block 918 (i.e., the new setting is stored). In case the operator of UE 200 wishes to activate the biometric authentication again at a later stage, the above procedure is performed once more so that in case of a positive authentication result in block 906, the re-activation setting can be stored in block 918. In FIG. 7A, a third variant is illustrated in which the operator of UE 200 requested to replace the biometric data previously stored in the subscriber record with new biometric data. In this variant, UDM 512 requires the operator to enter a first set of biometric data that will temporarily be stored (blocks 908 and 910) and, thereafter, a second set of biometric data (block 912). The signaling steps involved in blocks 908 and 912, including transmission of the GET BIOMETRIC DATA REQUEST message and the GET BIOMETRIC DATA RESPONSE message, have already been explained above.

Then, in block 914, the first and second sets of biometric data are checked to determine their similarity. If both sets are similar enough (e.g., in accordance with a threshold decision), one or both sets are confirmed as new biometric data (block 916) and stored in the associated subscriber record (block 918) for future biometric authentication procedures (e.g., as performed in step 906). If both sets are not similar enough, block 912 or both blocks 908 and 912 may be repeated.

Figure 7B:
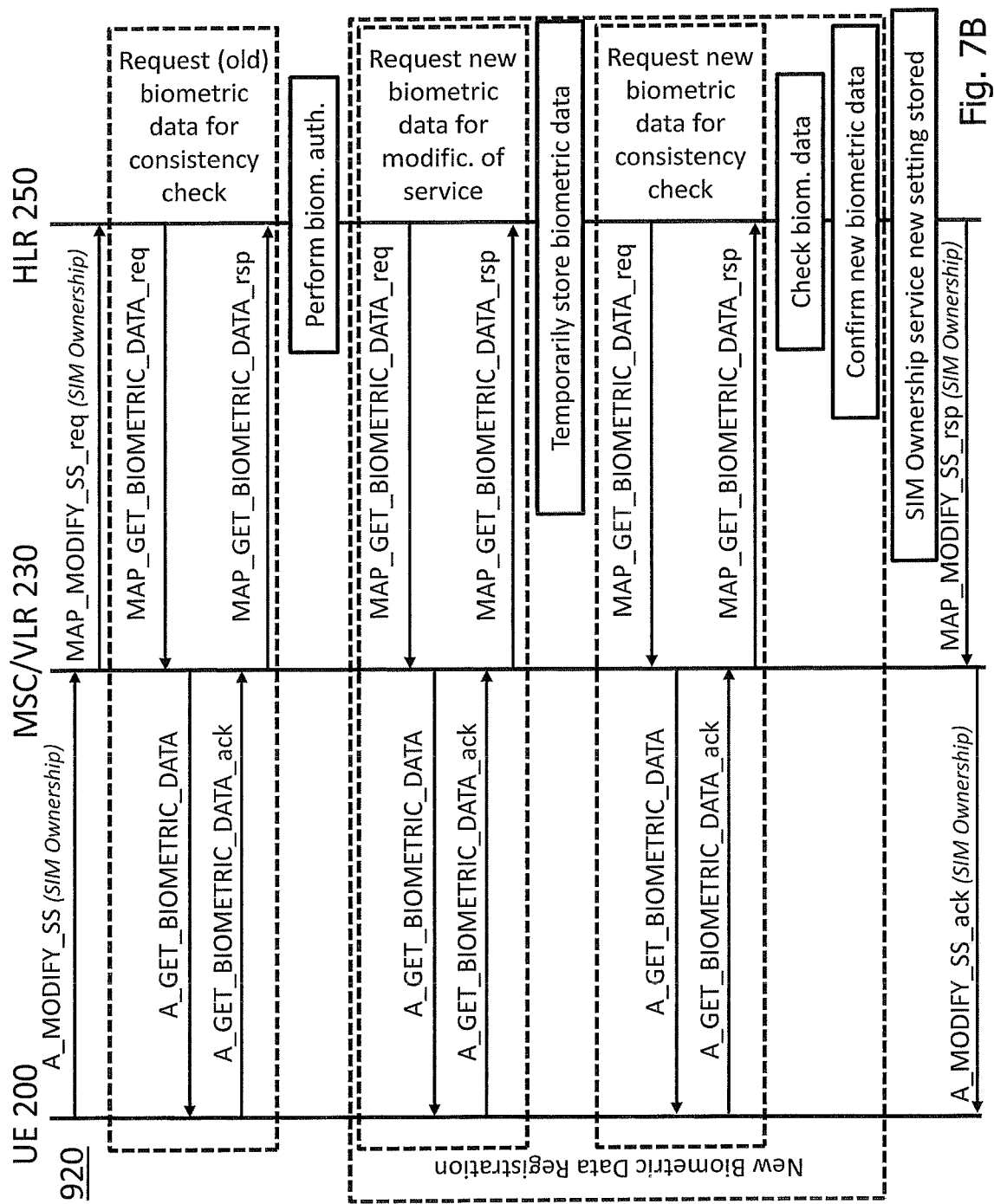

After block 918, service handling may be continued in an optional block 920. Moreover, AMF 510 sends a REGISTRATION ACCEPT message to the UE 200 to confirm the new settings in regard to the biometric authentication service While FIG. 7A illustrates a 5G scenario, it will be appreciated that a similar procedure can be performed in 2G/3G and 4G scenarios. In this regard, FIG. 7B shows a 2G/3G-specific signaling diagram 920 in which the roles of AMF 510 and UDM 512 are essentially taken over by MSC/VLR 230 and HLR 250, respectively. The signaling as such is 2G/3G-specific but substantially similar to the 5G-specific signaling described above with reference to FIG. 7A. A detailed description thereof is thus omitted here. In a similar manner, FIG. 7C shows a 4G-specific signaling diagram 940 in which the roles of AMF 510 and UDM 512 are essentially taken over by MME 270 and HSS 290, respectively. The signaling as such is 4G-specific but substantially similar to the 5G-specific signaling described above with reference to FIG. 7A.

FIG. 8 illustrates a signaling diagram 1000 in which, for a dedicated UE 200, the biometric authentication service has been set to active in the associated subscription record (as explained above with reference to FIG. 4A). Since the biometric authentication service has thus been activated, a communication endpoint such as another UE 201 located, from the perspective of the access and core network domains, opposite to the dedicated UE 200 may request biometric authentication of the operator of UE 200 in preparation of a data transmission to the UE 200. This procedure will in the following be explained in more detail with reference to a conditional transmission of an SMS from UE 201 to UE 200. The procedure may be performed in any of a 2G, 3G, 4G or 5G communication network.

As shown in FIG. 8, UE 201 may wish to transmit an SMS (with potentially confidential content) via the network towards UE 200. UE 201 marks this SMS to request a biometric authentication of the operator of UE 200 before the SMS is actually forwarded to UE 200. In an optional block 1002, the network (e.g., AMF 510 or UDM 512) detects that the SMS has been marked and checks if the biometric authentication service has been activated for the subscription associated with UE 200. If not, an error message may be returned to UE 201. Otherwise, a biometric authentication procedure is started in which the network requests a first set of biometric data from the operator of UE 200 (see step 402 in FIG. 2) and receives the requested first set of data (see step 412 in FIG. 2). Then, in block 1004, the first set of biometric data thus received is authenticated based on a second set of biometric data as stored in a subscriber database (steps 414, 416 and 418 of FIG. 2). In case the authentication in block 1004 was successful, the SMS is forwarded to UE 200. Otherwise, an error message is sent to both the UE 200 and the UE 201.

It will be appreciated that instead of an SMS scenario, other messaging or communication scenarios may be implemented in the manner illustrated in FIG. 8. Moreover, the other communication endpoint could also be a web server instead of UE 201 (e.g., for secure online banking, the SMS could contain a transaction code that should only reach the legitimate account holder).

FIG. 9 illustrates in a signaling diagram 1100 a procedure of having identity information that is stored, in association with the biometric data, in the subscriber database 310 certified by a certification authority. The certification authority may be represented by a certification center 1150 (e.g., a post office, a network provider's SIM outlet/shop, a municipality office or a police station). Such identity information includes in particular the subscriber's first and last name, optionally in addition with his or her address information.

The operator/owner of UE 200 (with its SIM 210) first visits the certification center 1150 in person with his or her valid identity document (e.g., a passport or driver's license) with the identity information (or a portion thereof) that is also stored in the subscriber database 310, see block 1104. In block 1106, an officer of the certification center 1150 checks the identity document and calls the MSISDN number of UE 200 so as to check that a speech connection can be established (of course, SMS or other communication means could be used also here).

Next, the certification center 1150 requests from the network (e.g., network node 300 of FIG. 1) temporary certification of the user identity, which will be accepted by the network.

Then the certification center 1150 requests the network to start the certification procedure. In an identity request message, the network will still request a corresponding permission from (the operator of) UE 200, which will indeed be given in the scenario of FIG. 9. In a next step, the network requests a set of biometric data from the operator of UE 200 (see step 402 in FIG. 2) and receives the requested set of biometric data (see step 412 in FIG. 2). Then, in block 1108, the set of biometric data thus received is authenticated by the network based on the biometric data stored in the subscriber database 310 (see step 418 in FIG. 2). In some variants, the identity request is included in the request message for biometric data (i.e., the latter message may substitute a dedicated identity request message).

In case the authentication in block 1108 was successful, the network confirms towards the certification center 1150 that the person at the certification center is indeed the person that is registered in association with the SIM 210 in subscriber database 310. In this context, the network may also return the subscriber identity information stored in the subscriber database 310 to the certification center 1150.

The certification center 1150 then checks the identity information at hand (e.g., the passport details) in block 1110 based on the identity information received from the network (e.g., first and last name and birthday). In case the check is successful, the certification center 1150 certifies the identity towards the network. As an option, the network then confirms towards the certification center 1150 that the certification has been accepted. Further, the network may update the associated subscription record in the subscriber database 310 to record that the biometric data stored therein has been "identity certified" (e.g., by a flag or other setting).

Aother variants, the certification center 1150 may directly upload the user identity information into the database 310. Such a step may occur directly after block 1106 in FIG. 9.

The identity certification discussed above may be the basis for "strong" authentication requirements (e.g., online banking). As such, different levels of authentication (biometric authentication with/without identity certification, identity certification alone, etc.) may selectively be offered by network providers, and certain applications may only work with "strong" authentication.

Figure 10:
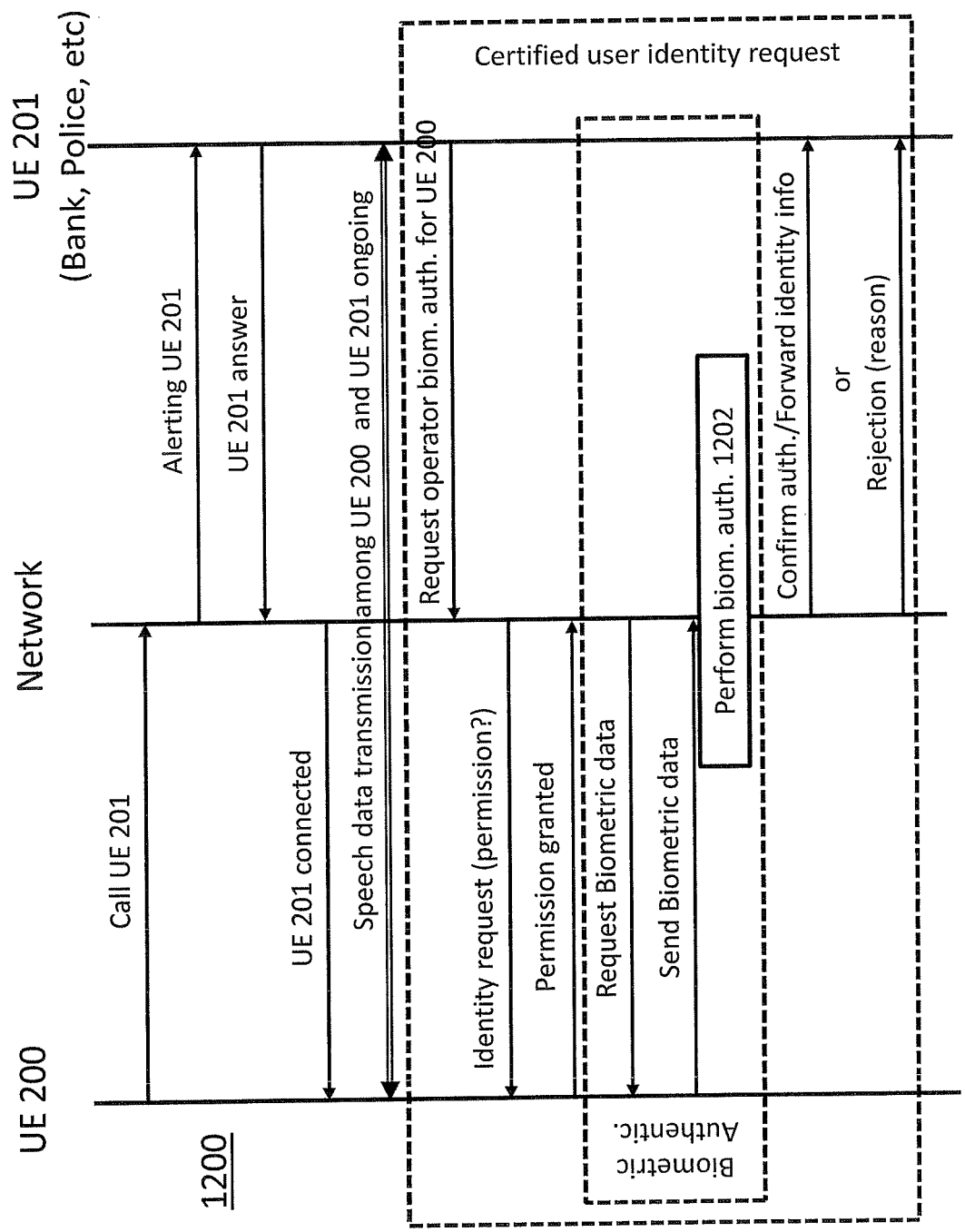

FIG. 10 illustrates in a signaling diagram 1200 a procedure in which during an ongoing speech call or other communication session between two UEs 200, 201 one of the two UEs (here: UE 201) requests a identity certification of the operator of the other UE (here: UE 200) by sending a corresponding request message to the network (e.g., network node 300 of FIG. 1). The network sends an identity request to UE 200 to ask for a corresponding permission from the operator of UE 200 and, if permission is granted, the network requests a first set of biometric data from the operator of UE 200 (see step 402 in FIG. 2) and receives the requested first set of data (see step 412 in FIG. 2).

Figure 2:
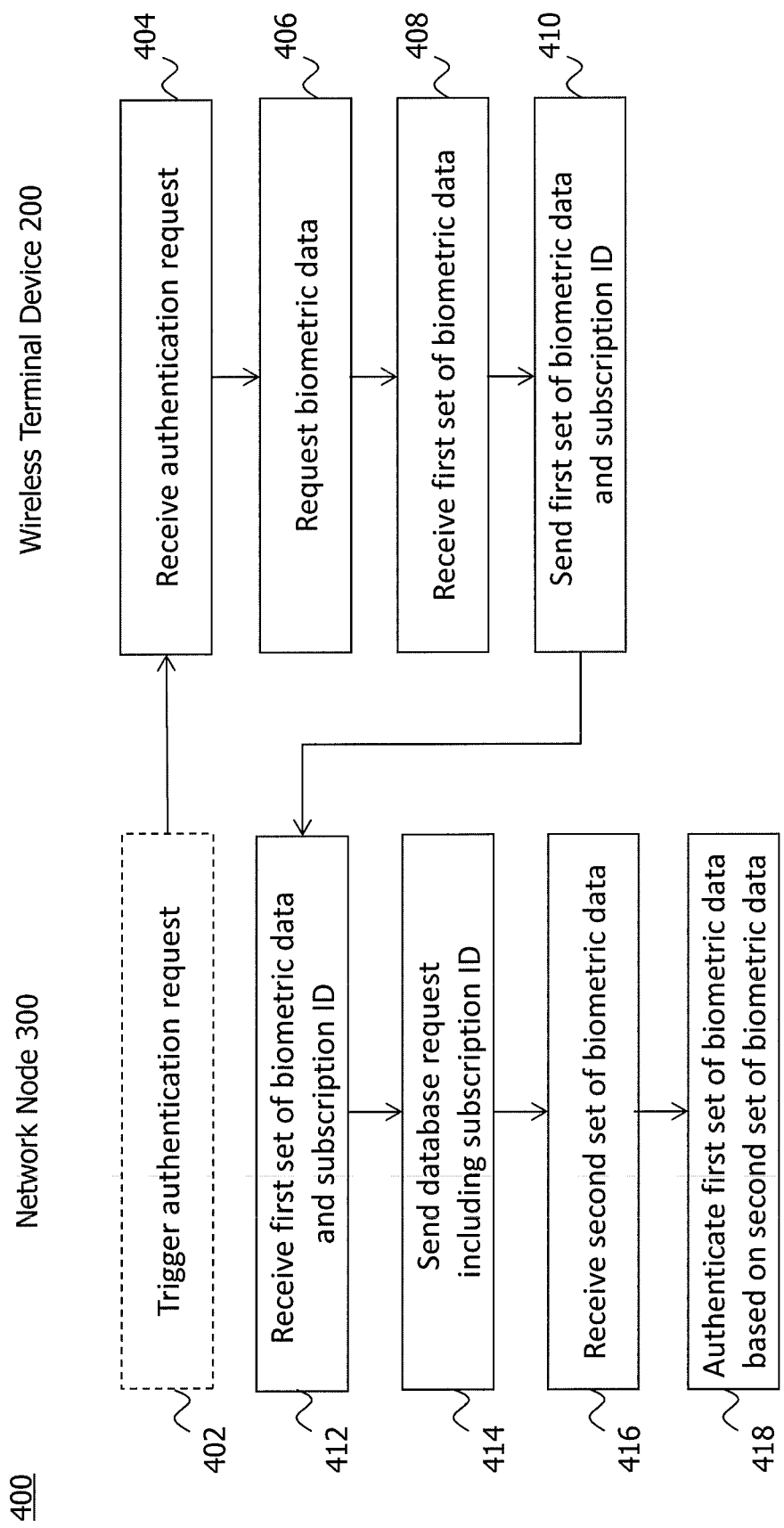
FIG. 2 is a flow diagram illustrating method embodiments of the present disclosure.

Then, in block 1202, the first set of biometric data thus received is authenticated based on a second set of biometric data as stored in a subscriber database 310 (see steps 414, 416 and 418 of FIG. 2). In case the authentication in block 1202 was successful, the identity of the operator of UE 200 (e.g., first and last name, possibly with birthday and/or address) is confirmed and forwarded to UE 201 (e.g., for display). This confirmation is based on the earlier "strong" authentication that has been performed as illustrated in FIG. 9 and registered in the subscriber database 310.

In case the authentication in block 1202 has failed, an error message is sent to UE 201, possibly with reasons for the authentication failure. In some variants, the "certified user identity request" procedures as illustrated in dashed lines in FIGS. 9 and 10 may be identical.

It is evident that UE 201 could also be replaced by a web server (e.g., an online banking server or a shopping portal server) in communication with UE 200.

In the signaling diagram of FIG. 10, the permission request and the request for biometric data may be merged into a single message. Again, the network internal messages are not illustrated as they depend on the network type (e.g., 2G/3G, 4G or 5G).

As has become apparent from the above embodiments, the biometric authentication proposed here permits to authenticate not only the SIM 210 per se, but also the current operator of a wireless terminal device 200 equipped with the SIM 210. In this way, unauthorized SIM "cloning" can be prevented or at least reduced.

In certain use scenarios, "strong" authentication may be desired that requires that identity information and/or biometric data stored in the network for a particular SIM 210 are additionally certified by a certification authority. This makes the authentication procedure described herein specifically usable for security-critical applications such as online banking or municipal/governmental transactions. Moreover, UE 200 with SIM 210 could be used as a replacement for an identity document by permitting certified (i.e., "strong") biometric identification.

The invention claimed is:

1. A method of authenticating an operator of a wireless first terminal device performed by a network node, the first terminal device comprising a subscriber identity module (SIM), wherein a subscription identifier is stored in the SIM, the method comprising:

the network node receiving the subscription identifier or a temporary identifier associated with the subscription identifier;

the network node receiving from a communication endpoint a trigger for triggering the network node to trigger an authentication request prompting the operator to enter a first set of biometric data, wherein the first set of biometric data is received responsive to the authentication request, the first terminal device is communicating or starting to communicate with the communication endpoint that is located opposite to the first terminal device, and the communication endpoint is one of a second terminal device and a web server;

the network node receiving the first set of biometric data of the operator, wherein the first set of biometric data has been entered by the operator at the first terminal device;

the network node sending a first database request towards a subscriber database in a core network domain of a wireless communication system, the first database request including the subscription identifier or the temporary identifier;

the network node receiving, in response to the first database request, a second set of biometric data associated in the subscriber database with the subscription identifier or the temporary identifier; and the network node authenticating the first set of biometric data on the basis of the second set of biometric data so as to obtain a first authentication result.

2. The method of claim 1, wherein
the authentication request is triggered responsive to or after a positive evaluation that biometric authentication has been activated for a subscription associated with the subscription identifier or the temporary identifier.

3. The method claim 2, further comprising:
the network node storing information pertaining to at least one of activation, deactivation, and invocation settings of biometric authentication in the subscriber database or in association therewith.

4. The method of claim 1, wherein
the authentication request is triggered in the context of or in response to activation, modification, or deactivation of biometric authentication for a subscription associated with the subscription identifier or the temporary identifier.

5. The method of claim 1, wherein
the authentication request is triggered in the context of a SIM authentication procedure.

6. The method of claim 5, wherein
in the context of the SIM authentication procedure at least one further authentication is performed that is based on a secret character string associated with the subscription identifier or the temporary identifier, and
the at least one further authentication comprises:
the network node receiving a first character string, wherein the first character string has been entered by the operator at the first terminal device;
the network node sending a second database request towards the subscriber database, the second database request including the subscription identifier or the temporary identifier;
the network node receiving, in response to the second database request, a second character string associated in the subscriber database with the subscription identifier or the temporary identifier, wherein the second character string is the secret character string; and
the network node authenticating the first character string on the basis of the second character string so as to obtain a second authentication result.

7. The method of claim 5, wherein
in the context of the SIM authentication procedure at least one further authentication is performed that is based on a secret character string associated with the subscription identifier or the temporary identifier.

8. The method of claim 1, wherein
the trigger is received in preparation of a data transmission from the communication endpoint to the first terminal device.

9. The method of claim 8, wherein
the data transmission is based on a messaging service for which the communication endpoint has specifically requested authentication of the operator of the first terminal device.

10. The method of claim 1, wherein
the second set of biometric data in the subscriber database has been certified by a certification authority.

11. The method of claim 1, wherein
the subscriber database contains information about an identity of a subscriber, and wherein the identity has also been confirmed by a certification authority.

12. The method of claim 1, wherein
the subscription identifier is one of an international mobile subscriber identifier, IMSI, and a subscription permanent identifier, SUPI, and
the temporary identifier is one of a temporary international mobile subscriber identifier, TMSI, and a globally unique temporary identifier, GUTI.

13. A non-transitory computer readable storage medium storing program code to perform the method of claim 1 when the program code is executed by least one processor.

14. The method of claim 1, wherein the authentication request is triggered in response to invocation of a service being requested by or for the first terminal device.

15. A method of authenticating an operator of a wireless terminal device performed by the wireless terminal device, the terminal device comprising a subscriber identity module (SIM) wherein a subscription identifier is stored in the SIM, the method being performed by the terminal device and comprising:
wirelessly receiving from a network node an authentication request transmitted by the network node in response to the network node receiving a trigger from a communication endpoint;
requesting, in response to the authentication request, a set of biometric data of the operator of the first terminal device;
receiving the set of biometric data from the operator at the terminal device; and
wirelessly transmitting to a network node the subscription identifier, or a temporary identifier associated with the subscription identifier, and the set of biometric data of the operator for authentication of the operator, wherein
the terminal device is communicating or starting to communicate with a communication endpoint that is located opposite to the terminal device, and
the communication endpoint is one of a second terminal device and a web server.

16. The method of claim 15, wherein
the authentication request is received in the context of, or in response to, activating, modifying, or deactivating biometric authentication for a subscription associated with the subscription identifier or the temporary identifier.

17. The method of claim 15, comprising
setting at least one invocation condition defining when biometric authentication of the operator is to be invoked, wherein
the at least one invocation condition is selected from a condition set comprising invocation upon SIM authentication, invocation upon activation of a new SIM, invocation upon association of the SIM with a new device, a periodical invocation, invocation upon invocation of a service, and invocation upon a third party request.

18. The method of claim 15, wherein
the trigger is received by the network node in preparation of a data transmission from the communication endpoint to the terminal device.

19. The method of claim 15, comprising:
receiving an identity request for a verification of an identity of a subscriber associated with the SIM, wherein the subscriber database contains information about the identity that has previously been certified by a certification authority.

20. The method of claim 19, wherein
the identity request is received together with the authentication request, or
the authentication request includes the identity request.

21. A network node or network node system for authenticating an operator of a wireless first terminal device, the first terminal device comprising a subscriber identity module (SIM), wherein a subscription identifier is stored in the SIM, the network node or network node system being configured to:
receive the subscription identifier or a temporary identifier associated with the subscription identifier;
receiving from a communication endpoint a trigger for triggering the network node to trigger an authentication request prompting the operator to enter a first set of biometric data, wherein the first set of biometric data is received responsive to the authentication request, the first terminal device is communicating or starting to communicate with the communication endpoint that is located opposite to the first terminal device, and the communication endpoint is one of a second terminal device and a web server;
receive the first set of biometric data of the operator, wherein the first set of biometric data has been entered by the operator at the first terminal device;
send a first database request towards a subscriber database in a core network domain of a wireless communication system, the first database request including the subscription identifier or the temporary identifier;
receive, in response to the first database request, a second set of biometric data associated in the subscriber database with the subscription identifier or the temporary identifier; and
authenticate the first set of biometric data on the basis of the second set of biometric data so as to obtain a first authentication result.

22. A wireless terminal device configured to assist in authenticating an operator thereof, the terminal device comprising a subscriber identity module, SIM, wherein a subscription identifier is stored in the SIM, the terminal device being configured to:
wirelessly receive from a network node an authentication request transmitted by the network node in response to the network node receiving a trigger from a communication endpoint;
request, in response to the authentication request, a set of biometric data of the operator of the terminal device;
receive the set of biometric data from the operator at the terminal device; and
wirelessly transmit to a network node the subscription identifier, or a temporary identifier associated with the subscription identifier, and the set of biometric data of the operator for authentication of the operator, wherein
the terminal device is communicating or starting to communicate with a communication endpoint that is located opposite to the terminal device, and
the communication endpoint is one of a second terminal device and a web server.

\* \* \* \* \*